(12) United States Patent
Mizushima et al.

(10) Patent No.: US 8,446,288 B2
(45) Date of Patent: May 21, 2013

(54) LIGHT PROJECTION DEVICE

(75) Inventors: Tetsuro Mizushima, Hyogo (JP);
Kazuhisa Yamamoto, Osaka (JP);
Akira Kurozuka, Osaka (JP); Kakuya Yamamoto, Hyogo (JP); Keiji Sugiyama, Kyoto (JP); Kenji Nakayama, Osaka (JP)

(73) Assignee: Panasonic Corporation, Osaka (JP)

( * ) Notice: Subject to any disclaimer, the term of this patent is extended or adjusted under 35 U.S.C. 154(b) by 570 days.

(21) Appl. No.: 12/808,055

(22) PCT Filed: Sep. 30, 2009

(86) PCT No.: PCT/JP2009/005027
§ 371 (c)(1),
(2), (4) Date: Jun. 14, 2010

(87) PCT Pub. No.: WO2010/044204
PCT Pub. Date: Apr. 22, 2010

(65) Prior Publication Data
US 2010/0289664 A1 Nov. 18, 2010

(30) Foreign Application Priority Data

Oct. 15, 2008 (JP) ................................ 2008-265977

(51) Int. Cl.
G08B 1/08 (2006.01)
G08B 13/14 (2006.01)
G08B 21/00 (2006.01)
G06F 19/00 (2006.01)
G05B 19/04 (2006.01)
G05B 15/00 (2006.01)

(52) U.S. Cl.
USPC ............... 340/691.6; 340/539.1; 340/539.13; 340/571; 340/572.1; 340/568.1; 340/686.1; 700/245; 700/246; 700/253; 700/258; 700/259

(58) Field of Classification Search
None
See application file for complete search history.

(56) References Cited

U.S. PATENT DOCUMENTS 6,567,134 B1 * 5/2003 Morgan ........................ 348/743
6,611,297 B1 8/2003 Akashi et al.
(Continued)

FOREIGN PATENT DOCUMENTS

CN 1839748 10/2006
JP 11-311680 11/1999
(Continued)

OTHER PUBLICATIONS

International Search Report issued Dec. 28, 2009 in International (PCT) Application No. PCT/JP2009/005027.

*Primary Examiner* — Julie Lieu
(74) *Attorney, Agent, or Firm* — Wenderoth, Lind & Ponack, L.L.P.

(57) ABSTRACT

A light projection device, includes a movable projector section which illuminates or display information by projecting light while moving a projection position; a position detecting section which detects a position of a lost article instructed by a user; a view field detecting section which detects a view field of the user, and a controller section which controls said movable projection section based on the lost article detected by the position detecting section and the view field of the user detected by the view field detecting section, and either directly illuminates the lost article or projects guide information for guiding the user to the lost article within a view field of the user.

20 Claims, 18 Drawing Sheets

U.S. PATENT DOCUMENTS

| | | | |
|---|---|---|---|
| 8,085,410 B1 * | 12/2011 | Hargabus | 356/614 |
| 8,244,403 B2 * | 8/2012 | Lin et al. | 700/253 |
| 8,297,758 B2 * | 10/2012 | Choi et al. | 353/94 |
| 8,342,697 B2 * | 1/2013 | Iwanaga | 353/94 |
| 2006/0195226 A1 * | 8/2006 | Matsukawa et al. | 700/245 |
| 2007/0285928 A1 * | 12/2007 | Suzuki | 362/296 |
| 2008/0275630 A1 * | 11/2008 | Regienczuk | 701/200 |
| 2009/0015406 A1 * | 1/2009 | Seacat | 340/572.1 |
| 2009/0067453 A1 | 3/2009 | Mizuuchi et al. | |
| 2009/0080175 A1 | 3/2009 | Mizuno et al. | |
| 2010/0295854 A1 * | 11/2010 | Miller | 345/427 |
| 2013/0021587 A1 * | 1/2013 | Miyazaki et al. | 353/85 |

FOREIGN PATENT DOCUMENTS

| | | |
|---|---|---|
| JP | 2000-298544 | 10/2000 |
| JP | 2002-534704 | 10/2002 |
| JP | 2004-246814 | 9/2004 |
| JP | 2004-294403 | 10/2004 |
| JP | 2006-156416 | 6/2006 |
| JP | 2007-86545 | 4/2007 |
| JP | 2007-219966 | 8/2007 |
| JP | 2007-319447 | 12/2007 |
| WO | 2005/015466 | 2/2005 |
| WO | 2006/109730 | 10/2006 |

* cited by examiner

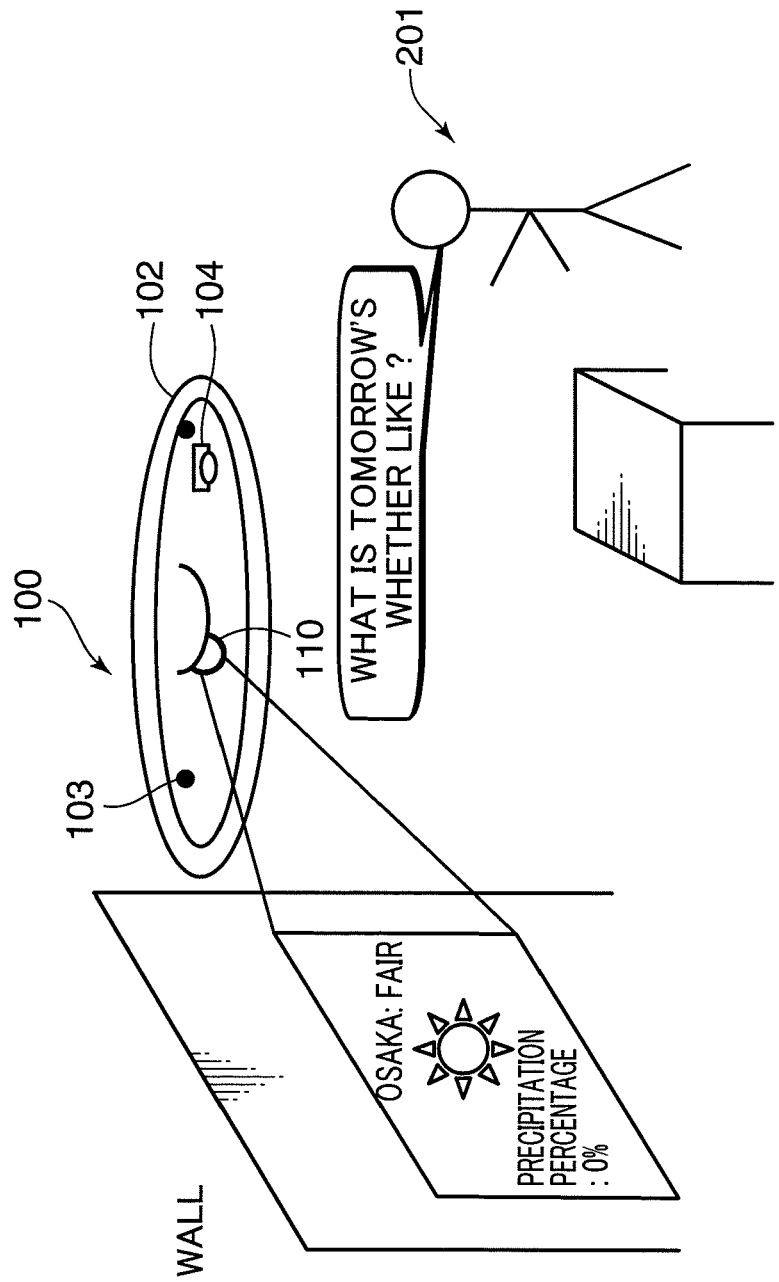

REMOTE CONTROLLER

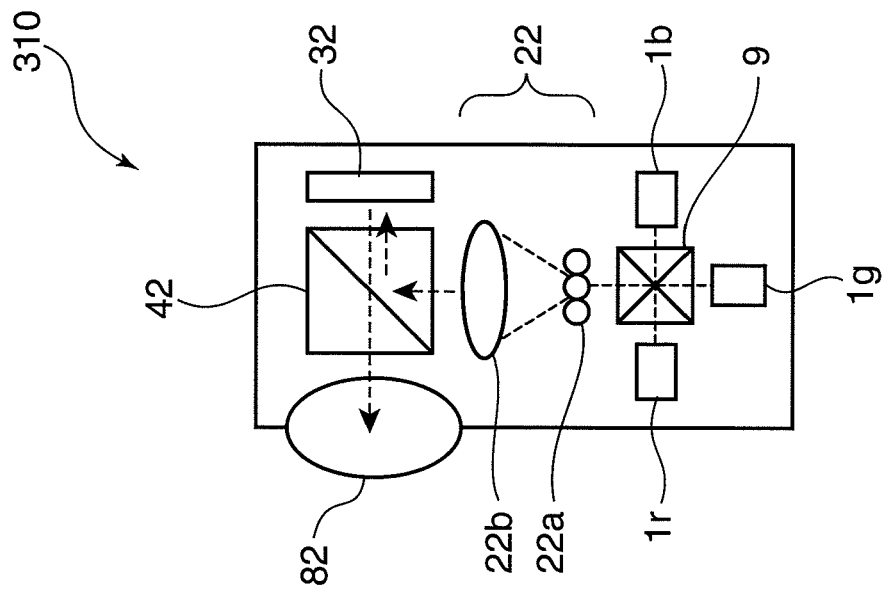
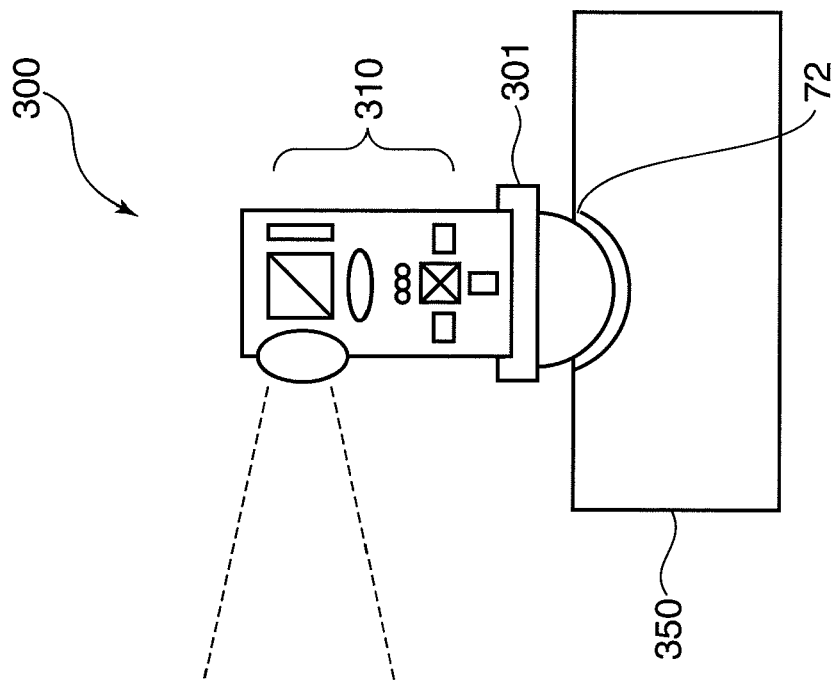

LIGHT PROJECTION DEVICE

TECHNICAL FIELD

The present invention relates to a light projection device that projects light for illumination or information display.

In an indoor place, occasionally, a person does not know where an article is at, and scouts around for the article because he/she cannot find the lost article quickly. Hence, there has been developed a search system for notifying a person of a position of a lost article.

For example, Patent Document 1 proposes a notification terminal attached to an article, which has a function of receiving a radio wave. When receiving a radio wave, the notification terminal produces sound or light to notify a person of a position of the lost article.

In the conventional technique that each article is provided with such a notification terminal, however, a power supply or the like is required in order to activate the notification terminal. The power supply or the like results in increase of a size of and costs for the notification terminal. Consequently, it is difficult to apply this technique to a large number of articles.

On the other hand, Patent Document 2 proposes a technique that a small and wireless identification tag is attached to an article to allow a person to find the lost article. This technique can be applied to a large number of articles. Patent Document 2 discloses an information processing apparatus including means for receiving identification data from a wireless identification tag attached to an article to calculate position information, and display means for outputting the position information. Other than the above, various systems have been proposed conventionally for searching an article based on information from a wireless identification tag.

In the conventional article search system, however, adopted as the display means for displaying the position information is a display section of a carrying terminal or a stationary display terminal such as a TV monitor.

In the case where the means for displaying the position information is the display section of the carrying terminal, a user needs to search for an article while carrying the carrying terminal. Consequently, this case puts a burden upon the user. In addition, if the carrying terminal itself becomes lost, there arises a problem that the lost article search system is not available. In the case where the means for displaying the position information is the stationary display terminal, on the other hand, a user needs to move to a site where he/she can see the display on the stationary display terminal. Consequently, this case also puts a burden upon the user.

PRIOR ART DOCUMENTS

Patent Documents

Patent Document 1: Japanese Unexamined Patent Publication No. Hei 11-311680
Patent Document 2: Japanese Unexamined Patent Publication No. 2004-294403

SUMMARY OF THE INVENTION

It is an object of the present invention to provide a useful light projection device capable of searching for an article without a burden.

In order to accomplish this object, a light projection device, according to one aspect of the present invention, includes a movable projector section which illuminates or display information by projecting light while moving a projection position; a position detecting section which detects a position of a lost article instructed by a user; a view field detecting section which detects a view field of the user, and a controller section which controls said movable projection section based on the lost article detected by said position detecting section and the view field of the user detected by said view field detecting section, and either directly illuminates the lost article or projects guide information for guiding the user to the lost article within a view field of the user.

With this structure, when the user designates a lost article, the position detecting section detects a position of the lost article, and the view field of the detector section detects a view field of the user. On the basis of the results of detection, the controller section controls the movable projector section. Herein, since the movable projector section can shift the projection position, the controller section allows the movable projector section to project light onto the position of the lost article so as to directly illuminate the lost article. Moreover, in the case where the lost article cannot be illuminated directly, the controller section allows the movable projector section to project guide information for guiding the user to the lost article onto the view field of the user. As described above, the user can quickly find an article without a burden by virtue of assistance of the movable projector section that effects illumination or information display for use in a search for an article.

These and other objects, characteristics and superior matters of the present invention will be sufficiently understood from the following detailed description. Moreover, advantages of the present invention will be clarified by the following description with reference to the appended drawings.

BRIEF DESCRIPTION OF THE DRAWINGS

FIG. 5 shows a schematic structure and operations of the light projection device according to one embodiment of the present invention.

FIG. 8A shows a schematic structure of the light projection device according to one embodiment of the present invention. FIG. 8B is a schematic structure of a portable light projection device in the light projection device of FIG. 8A.

EMBODIMENTS OF THE INVENTION

Hereinafter, preferred embodiments of the present invention will be described with reference to the drawings. It should be noted that each of the following preferred embodiments is merely one example for embodying the present invention, and therefore does not intend to limit the technical scope of the present invention.

First Embodiment

Figure 15:
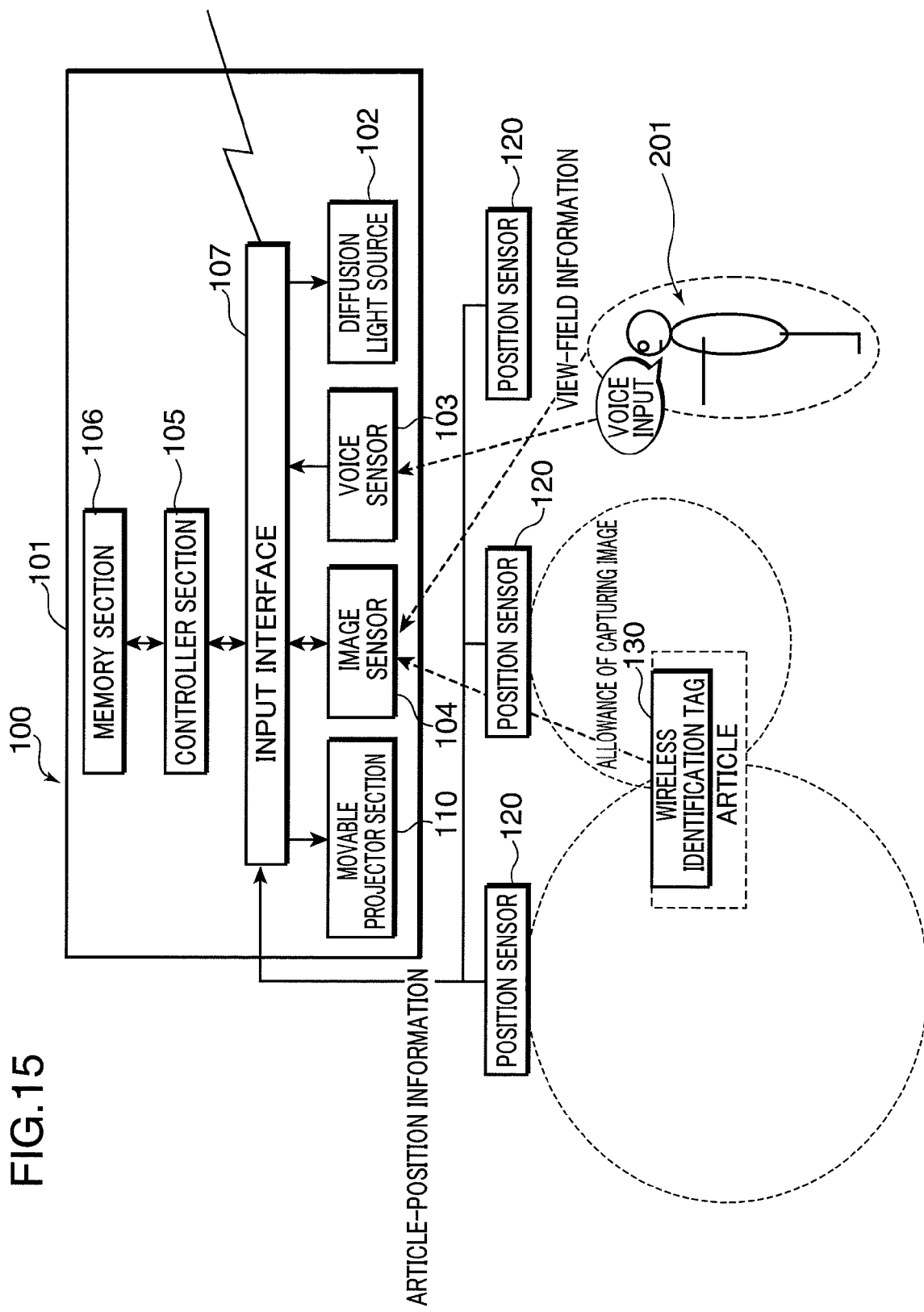
FIG. 15 shows a block diagram of a schematic structure of the light projection device according to one embodiment of the present invention.

FIG. 15 shows a schematic structure of a light projection device 100 according to the first embodiment of the present invention. The light projection device 100 includes a main body 101, a diffusion light source 102, a voice sensor 103, an image sensor 104, a controller section 105, a memory section 106, an input/output interface section 107, a movable projector section 110 and a position detector sensor 120.

Figure 1:
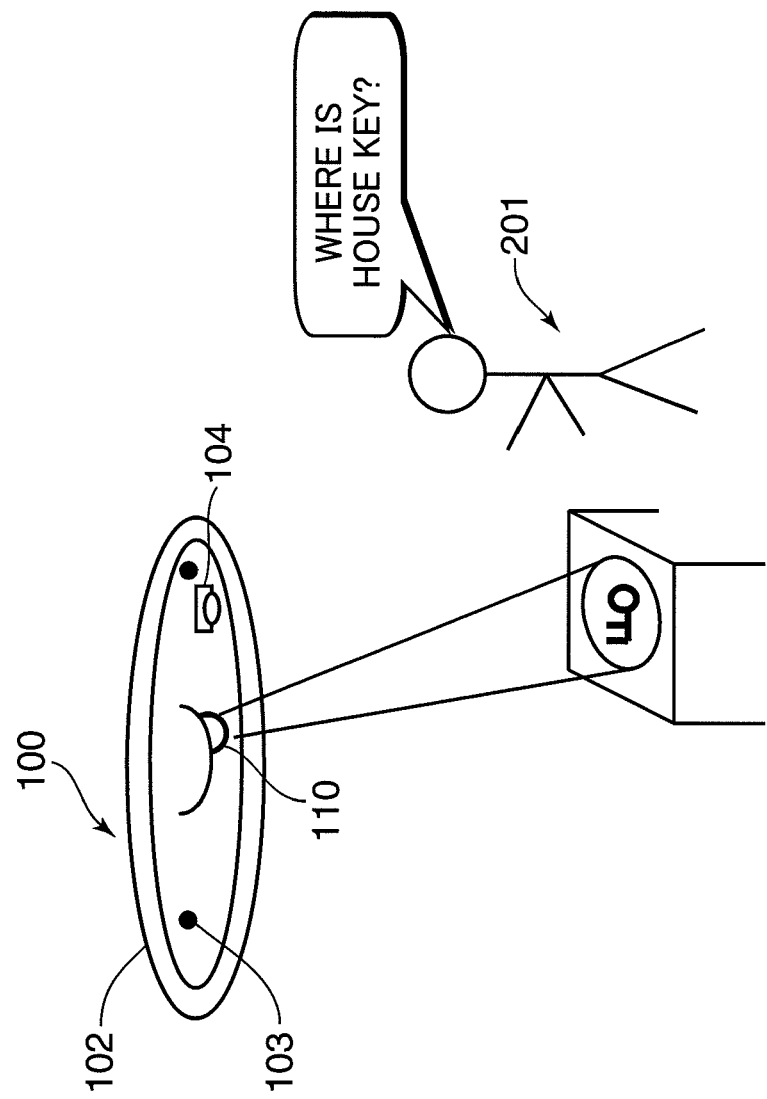
FIG. 1 shows a schematic structure and operations of a light projection device according to one embodiment of the present invention.
Figure 2:
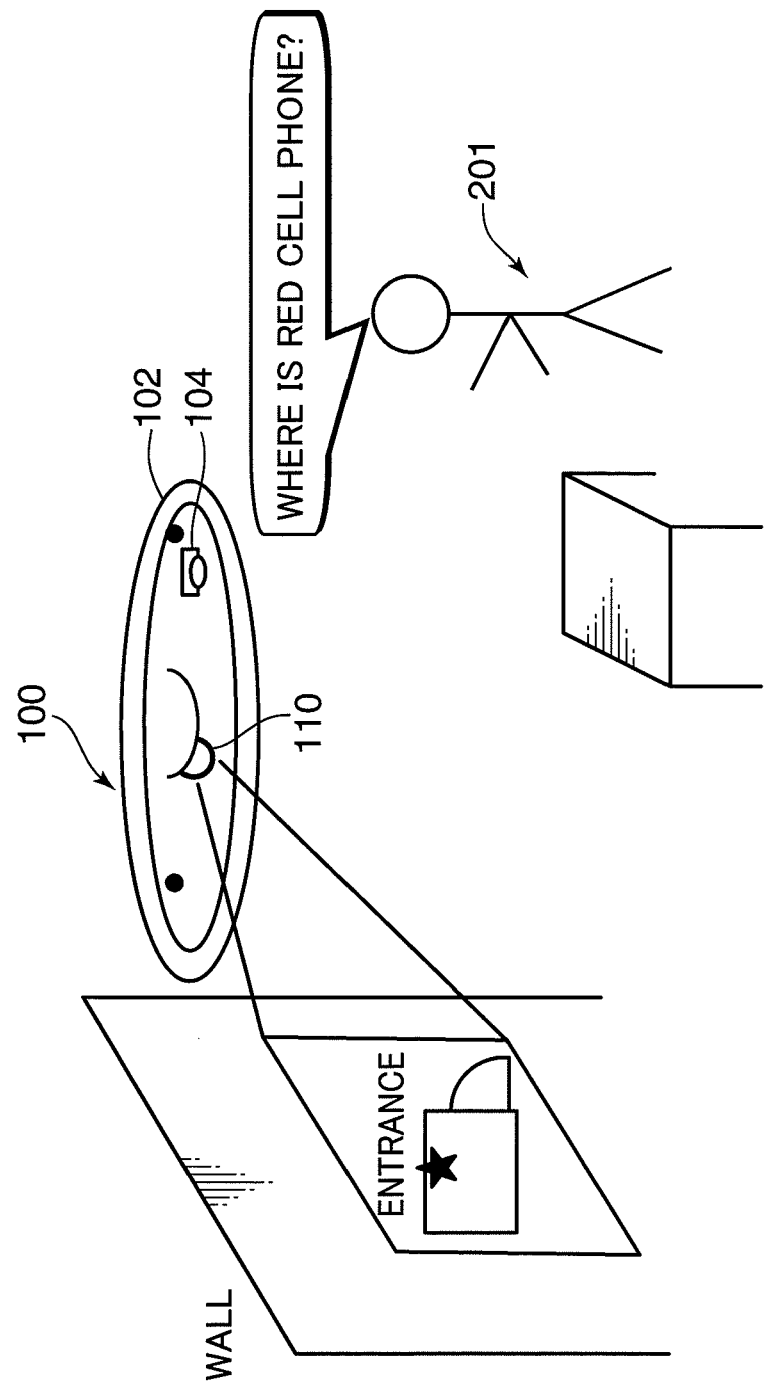
FIG. 2 shows a schematic structure and operations of the light projection device according to one embodiment of the present invention.
Figure 3:
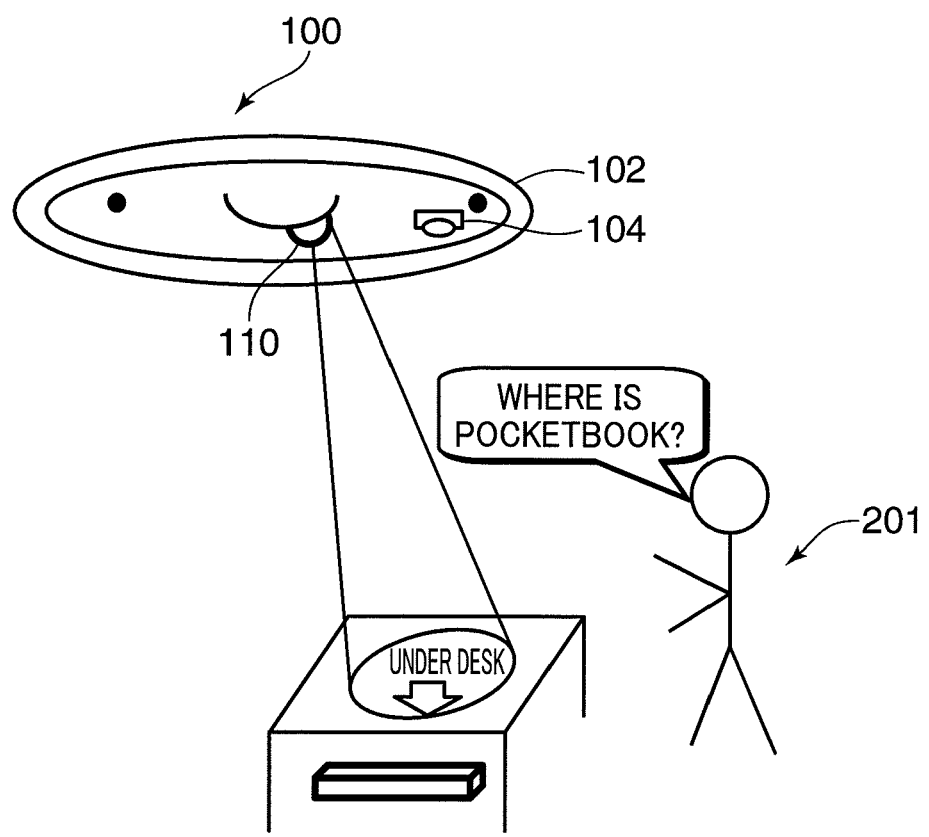
FIG. 3 shows a schematic structure and operations of the light projection device according to one embodiment of the present invention.

FIGS. 1 through 3 each show a schematic structure and operations of the light projection device 100 according to the first embodiment of the present invention.

The main body 101 of the light projection device 100 is installed on a ceiling of an indoor place, for example. In the light projection device 100, the movable projector section 110 of the main body 101 can freely set a projection region in the indoor place. In the light projection device 100, moreover, the voice sensor 103 of the main body 101 can recognize a voice of a user 201.

In the light projection device 100, the image sensor 104 of the main body 101 captures an image of the user 201, identifies a position and an orientation of the user 201 on the basis of image processing, and acquires a view field of the user 201. The image sensor 104 may be a solid state imaging device such as a CCD (Charge Coupled Device) image sensor. The image processing for acquiring the view field of the user 201 is executed by the controller section 105. The controller section (view field detector section) 105 can acquire the view field of the user 201 from known various personal identification (e.g., facial recognition) algorithms such as pattern matching.

The voice sensor 103 may also be used for acquiring the view field of the user 201. More specifically, when a plurality of (e.g., at least two) voice sensors 103 are placed in a main room in which the main body 101 of the light projection device 100 is installed, the controller section 105 can obtain the position and the orientation of the user 201 by use of such a characteristic that a signal intensity of a voice input from the user 201 attenuates in inversely proportional to a distance (distance attenuation characteristic). For example, in the case where a plurality of persons are in a room, it is impossible to identify the user 201 from among the plurality of persons even when an image of the room is captured by the image sensor 104. Also in this case, it is possible to identify the user 201 and acquire the view field of the user 201 by the combined use of the results of computation about the position and the orientation of the user 201 based on the voice input from the voice sensor 103.

In the present embodiment, a position of an article is calculated using a wireless identification tag 130 attached to the article, and a plurality of position detection sensors 120 (position detecting sections) for detecting position information originated from the wireless identification tag 130. The position detection sensors 120 are placed at a plurality of sites in the indoor place. The position detection sensor 120 is also placed at a site other than the main room in which the main body 101 of the light projection device 100 is installed. Therefore, it is possible to detect a position of an article having the wireless identification tag 130 attached thereto even in the case where the lost article exists in a site other than the main room.

It is possible to detect the position of the lost article having the wireless identification tag 130 attached thereto when the number of position detection sensors 120 is two or more. For example, it is possible to detect the position of the article from known various position detection algorithms such as the method of calculating the position of the wireless identification tag 130 using such a characteristic that an intensity of a received radio wave from the wireless identification tag 130 attenuates in inversely proportional to a distance (distance attenuation characteristic).

Each position detection sensor 120 is connected to the controller section 105 of the light projection device 100. The controller section 105 receives tag ID information of the wireless identification tag 130 and information such as an intensity of a received radio wave to calculate a position of an article. The position information of the article, which is calculated by the controller section 105, is stored in the memory section 106.

Information indicative of the relation between information indicating an article, such as a name, an appearance and a function and tag ID information of the wireless identification tag 130 (lookup table information or database information) is registered in the light projection device 100 in advance. Accordingly, it is possible to identify an article from a partial combination of name, an appearance, a function and the like of the article even in the case where a name of the article is unclear.

Moreover, image information of various articles is also registered in the memory section 106 in advance in order to recognize the article using a known pattern matching technique or the like. The image sensor 104 attempts to capture an image of a lost article, and the controller section 105 determines whether the light projection device 100 can directly illuminate the article, on the basis of the image as captured.

Further, display map information such as a layout sketch of the indoor place is also registered in the memory section 106 in advance in order to display a position of a lost article, which cannot be illuminated directly, in a map format.

Herein, operations of the light projection device 100 according to the present embodiment will be exemplified with reference to FIGS. 1 through 3.

In FIG. 1, the user 201 searches for a key of his/her house, and puts a question "Where is the key of the house?" to the light projection device 100 (i.e., inputs a voice to the light projection device 100). Herein, the light projection device 100 recognizes the voice of the user 201, and directly illuminates a small region on a position of "the key of the house" placed on a desk to notify the user 201 of the position of the lost article.

In FIG. 2, the user 201 searches for a red cell phone, and puts a question "Where is the red cell phone?" to the light projection device 100. Herein, the light projection device 100 recognizes the voice of the user 201, and projects an illustration and the like indicating a position of "the red cell phone" onto a wall (i.e., projects and displays guide information). More specifically, since "the red cell phone" is out of the main room in which the light projection device 100 is installed, the light projection device 100 fails to directly illuminate "the red cell phone". Therefore, the light projection device 100 projects guide information containing an illustration and characters onto the view field of the user 201 in order to guide the user 201 to "the red cell phone".

In FIG. 3, the user 201 searches for a pocketbook, and puts a question "Where is the pocketbook?" to the light projection device 100. Herein, the light projection device 100 recognizes the voice of the user 201, and directly illuminates a direction in which "the pocketbook" exists and, further, displays an arrow mark and characters to guide the user 201 such that the user 201 can easily find the lost article. In this example, the light projection device 100 recognizes the position of "the pocketbook" from the position information from the position detection sensor 120. However, since "the pocketbook" is under a top panel of a desk, the image sensor 104 fails to capture an image of "the pocketbook". Therefore, the light projection device 100 determines to fail to directly illuminate "the pocketbook", and displays the arrow mark and the characters indicating the position of "the pocketbook" on the top panel of the desk.

Figure 16:
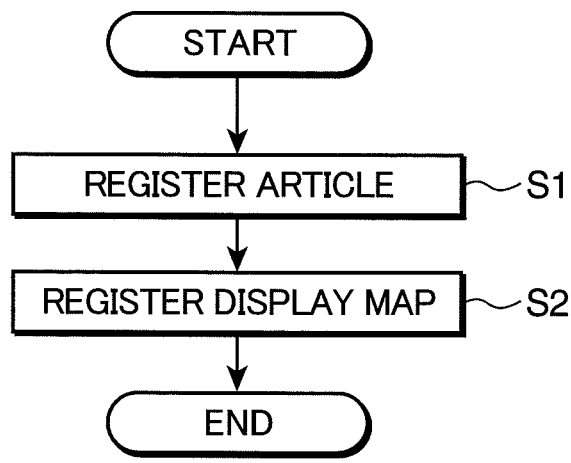
FIG. 16 shows a flowchart of the operations of the light projection device according to one embodiment of the present invention.
Figure 17:
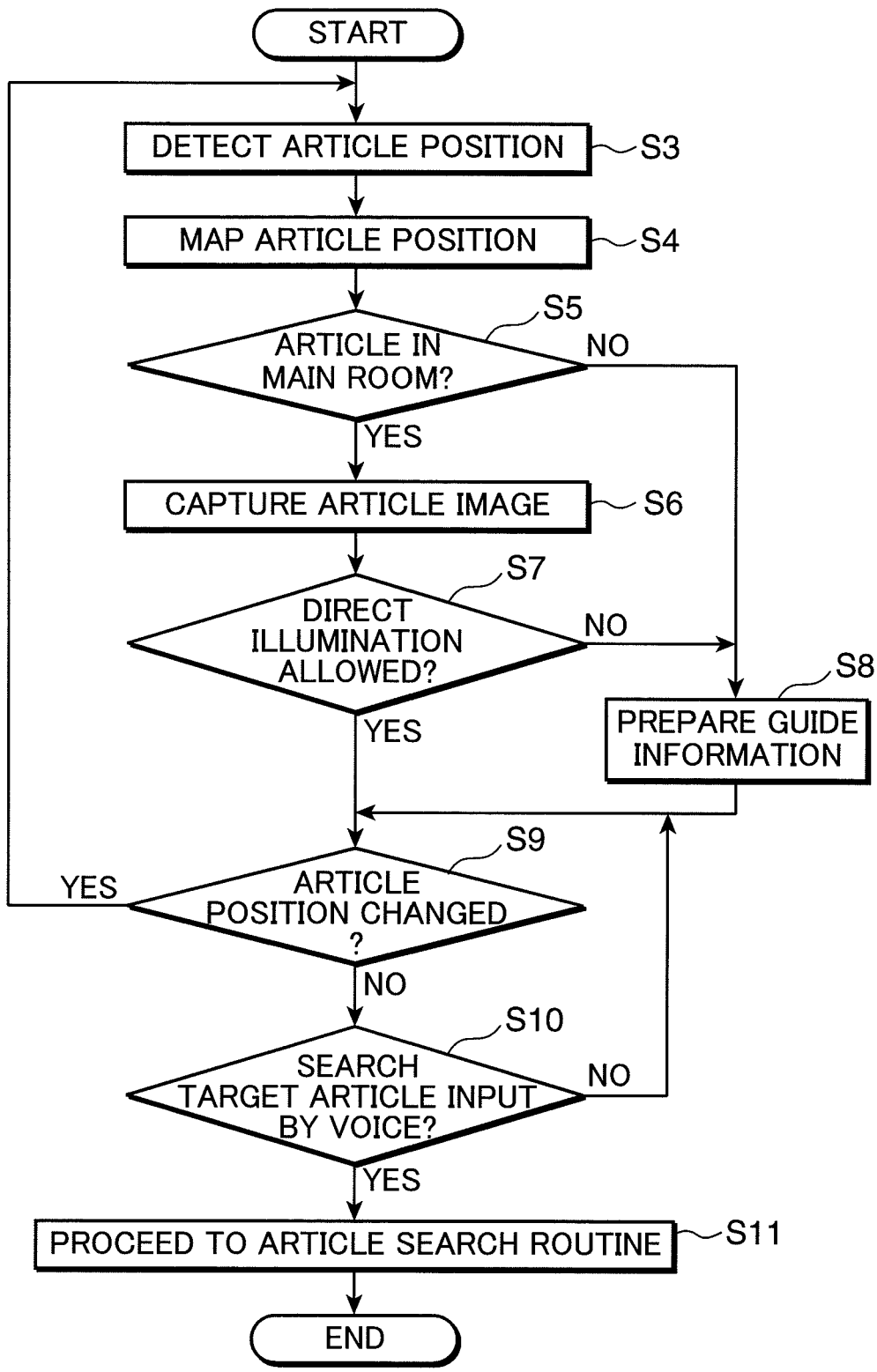
FIG. 17 shows a flowchart of the operations of the light projection device according to one embodiment of the present invention.
Figure 18:
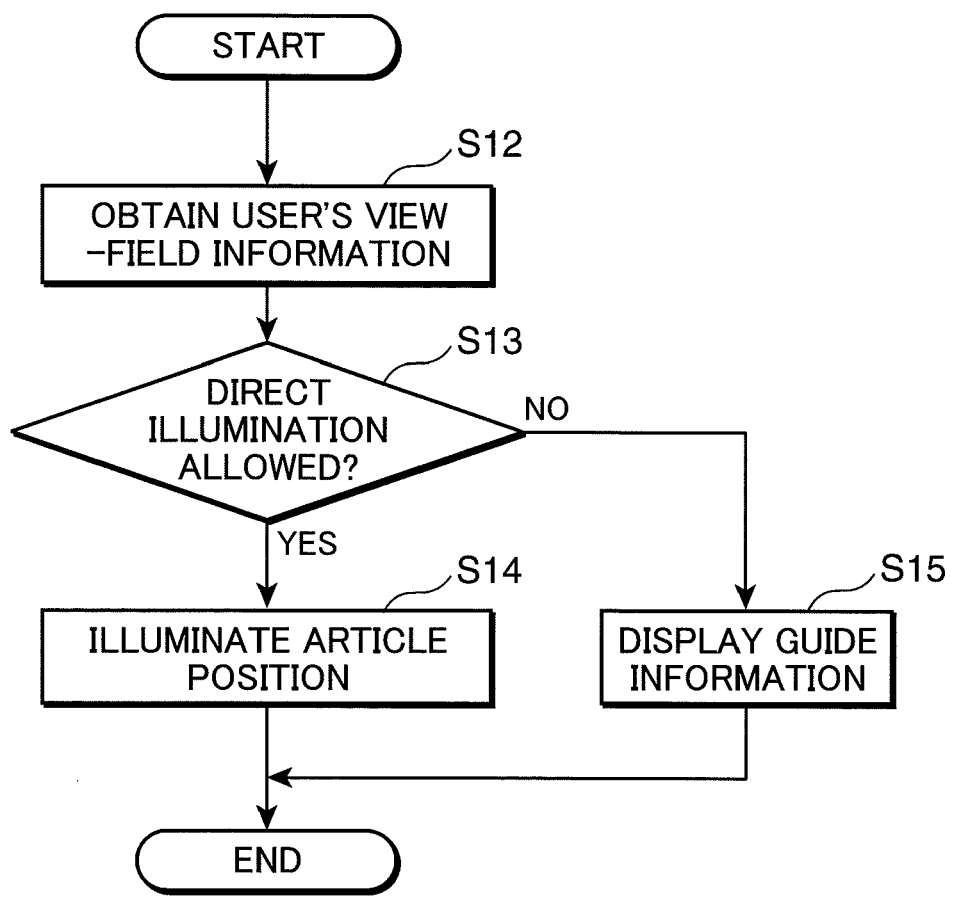
FIG. 18 shows a flowchart of the operations of the light projection device according to one embodiment of the present invention.

In order to realize the operations described above, the light projection device 100 executes an initial setting routine shown in FIG. 16, an article position information accumulating routine shown in FIG. 17, and a projecting routine shown in FIG. 18, respectively.

As shown in FIG. 16, registration of an article (S1) and registration of a display map (S2) are performed as initial settings for the light projection device 100. The article registration in S1 includes registration of the information about the relation between the article information (e.g., a name, an appearance, a function) and the tag ID information of the wireless identification tag 130. Moreover, the display map registration in S2 includes registration of the display map information such as the layout sketch of the indoor place. For example, the user manipulates an information input section connected to the input/output interface section 107 in a wired or wireless manner to input the information in S1 and the information in S2. This information is stored in the memory section 106. Thus, the processes in S1 and S2 are completed.

After completion of the initial settings, the article position information accumulating routine shown in FIG. 17 is executed. Specifically, the controller section 105 receives article position information from the plurality of position detection sensors 120 and detects a position of an article on the basis of the information position of the article (S3). Next, the controller section 105 describes the position of the article in the map information registered in S2 (S4). Next, when the article exists in the main room in which the main body 101 of the light projection device 100 is installed (YES in S5), the controller section 105 controls the image capturing sensor 105 such that the image sensor 104 attempts to capture an image of the article in the main room (S6). Next, when it is determined that the image of the article is captured successfully and the article can be illuminated directly (YES in S7), the controller section 105 creates no guide information. In this case, for example, the controller section 105 may set a flag indicating the fact that direct illumination is possible, at a predetermined bit in a memory region where the article information is stored.

On the other hand, when the lost article exists in a room other than the main room in which the main body 101 is installed (NO in S5) and when it is determined that the image of the article cannot be captured and the article cannot be illuminated directly (NO in S7), the controller section 105 creates guide information for guiding the user 201 to the lost article, and stores the guide information in the memory section 106 (S9).

Thereafter, each time the position of the article is changed (YES in S10), the controller section 105 executes the processes in S3 through S9 to update the stored article position information. When the user 201 inputs voice for searching for the lost article (YES in S10), the procedure proceeds to the projecting routine shown in FIG. 18 (S11).

In the projecting routine, the controller section 105 controls the image sensor 104 such that the image sensor 104 captures an image of the user 201 in the main room, and then acquires view field information of the user 201 (S12). Next, when it is determined that the lost article can be illuminated directly, on the basis of the user view field information and the stored article position information (YES in S13), the controller section 105 controls the movable projector section 110 such that the movable projector section 110 projects light for directly illuminating the article (S14).

On the other hand, when it is determined that the article cannot be illuminated directly, on the basis of the user view field information and the stored article position information (NO in S13), the controller section 105 controls the movable projector section 110 such that the movable projector section 110 projects the guide information for guiding the user 201 to the lost article onto the view field of the user 201 (S15).

As described above, in the position information accumulating routine, the article position information is stored while being updated, so that the projecting routine can be executed promptly after the user 201 inputs the voice in order to search for the lost article.

Figure 19:
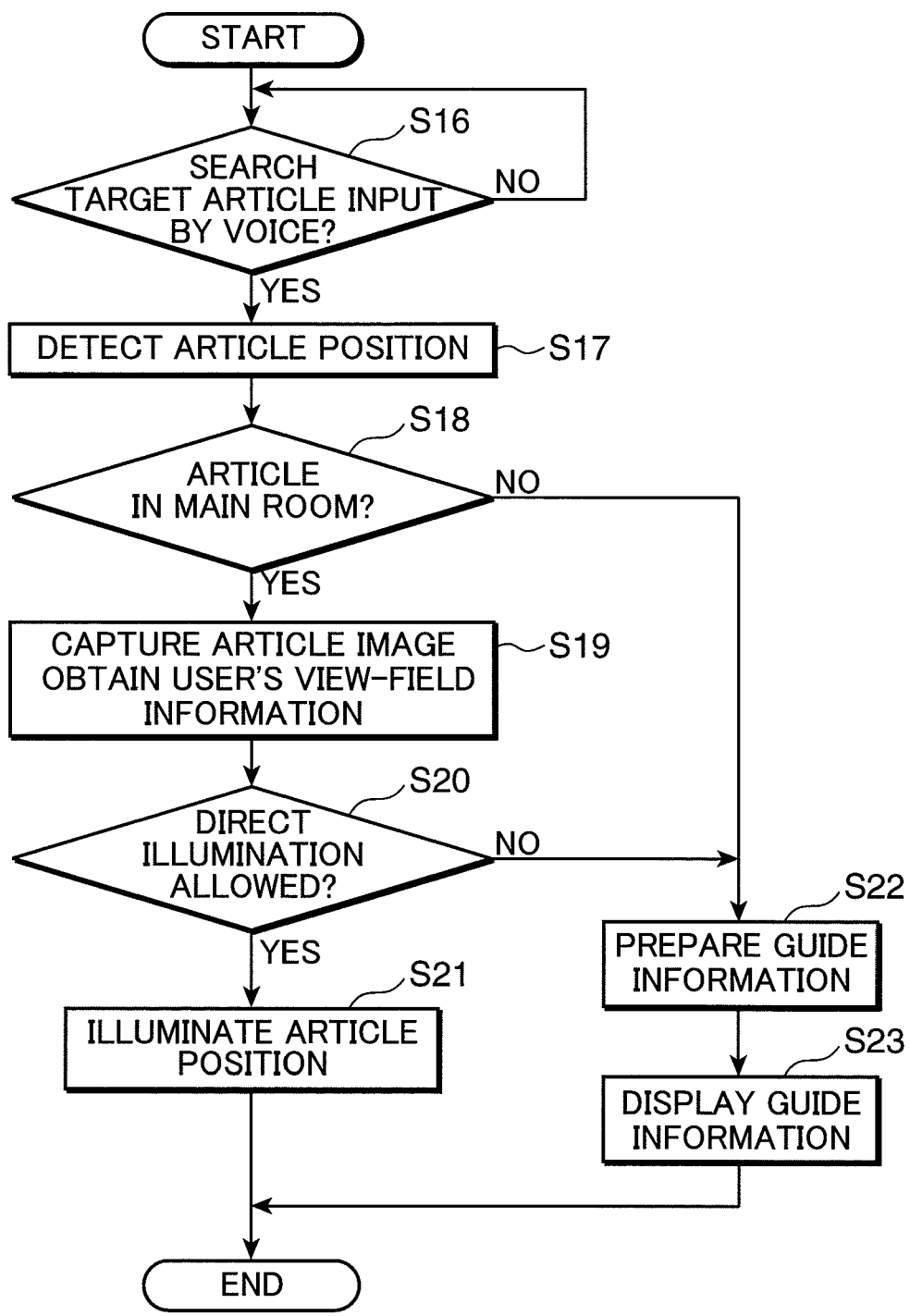
FIG. 19 shows a flowchart of the operations of the light projection device according to one embodiment of the present invention.

As shown in FIG. 19, the position of the lost article may be detected after the user 201 inputs the voice in order to search for the lost article, in place of the foregoing structure that the position information of the article is stored in advance. More specifically, when the user 201 inputs the voice in order to search for the lost article (YES in S16), the controller section 105 receives the article position information from the plurality of position detection sensors 120 to detect the position of the article on the basis of the position information of the lost article (S17). Next, when the lost article exists in the main room (YES in S18), the controller section 105 controls the image capturing sensor 104 such that the image capturing sensor 104 attempts to capture an image of the lost article, and acquires the user view field information (S19). Next, the controller section 105 determines whether the lost article can be illuminated directly, on the basis of the fact whether the image of the lost article can be captured and the view field information of the user 201 (S20). Next, when it is determined that the lost article can be illuminated directly (YES in S20), the controller section 105 controls the movable projector section 110 such that the movable projector section 110 projects light for directly illuminating the lost article (S21). On the other hand, when the lost article exists in a room other than the main room (NO in S18) and when it is determined that the lost article cannot be illuminated directly (NO in S20), the controller section 105 creates the guide information for guiding the user 201 to the lost article (S22), and controls the movable projector section 110 such that the movable projector section 110 projects the guide information onto the view field of the user 201 (S23).

The light projection device 100 according to the present embodiment is installed in the indoor place, and notifies the user 201, who designates article information such as a name, an appearance or a function, of a position of an article. Therefore, the light projection device 100 has a feature of projecting light to directly illuminate a position of an article and/or projecting guide information containing illustrations and characters onto a view field of the user 201 in order to guide the user 201 to an article.

As described above, since the lost article is illuminated directly, the user 201 can directly understand the position of the article and take necessary action.

Even in the case where the lost article cannot be illuminated directly, the light projection device 100 displays the illustration and the characters in the view field of the user 201 to guide the user 201 to the lost article. Thus, the user 201 can recognize the position information of the lost article and find the lost article. Moreover, even in the case where the lost article is in a drawer or is hidden behind a different article, the user 201 can immediately find the lost article on the basis of the direction of the projected light, the illustration and the characters. Conventionally, a position of a lost article is displayed on a specific display unit, and consequently a user needs to move to the specific display unit. On the other hand, the light projection device 100 according to the present embodiment eliminates this necessity, so that the user can search for an article anywhere in a room. Conventionally, a position of a lost article is displayed on a carrying display unit, and consequently a user needs to search for the carrying display unit itself or needs to carry the carrying display unit. On the other hand, the light projection device 100 according to the present embodiment allows the user 201 to search for an article in a state in which he/she carries no unit. Hence, the light projection device 100 according to the present embodiment is improved in usability because it displays a position of an article in an easy-to-understand manner and, also, allows the user 201 to immediately find the lost article without a burden.

The light projection device 100 according to the present embodiment illuminates a small region on a position of an article, and therefore can optionally set a shape of an illumination area. The shape of the illumination area is set in such a manner that light to be projected is subjected to spatial modulation. The light projection device 100 controls a spatial modulation element such that the spatial modulation element sets a shape and a size of a region where light is projected. This region where the light is projected corresponds to the illumination region of the light projection device 100.

In the light projection device 100 according to the present embodiment, moreover, an article, onto which light is projected, is provided with an information originating source including the wireless identification tag 130. The plurality of position detection sensors 120 inside and outside the main room are connected to the light projection device 100, and the position information of the lost article is stored in the light projection device 100. The light projection device 100 recognizes a lost article on the basis of a voice of the user 201 detected by the voice sensor 103. Thus, the light projection device 100 can precisely recognize the position of the lost article even when the lost article exists in the room other than the room in which the light projection device 100 is installed, and can manage position information about a large number of articles.

In combination with the display by direct illumination, according to the present embodiment, the voice input through the voice sensor 103 eliminates access to the apparatus by the user 201 in the case of searching for an article, so that the user 201 can search for the lost article without a burden. In such a situation that the user 201 is in a hurry, the user 201 can search for the lost article while doing a different task. Preferably, the light projection device 100 includes a plurality of voice sensors 103. The reason therefor is that by use of a difference among outputs from the plurality of voice sensors 103, a direction of the user 201 with respect to the light projection device 100 and a direction corresponding to the view field of the user 201 are calculated, so that a position in the view field of the user 201, where the light projection device 100 displays an illustration and characters, can be determined.

Moreover, the light projection device 100 includes the image sensor 104, acquires position information serving as a view field in such a manner that the image capturing sensor 104 captures an image of the user 201, and controls a position where the light projection device 100 projects an image. Moreover, the image capturing sensor 104 attempts to capture an image of a lost article to determine whether the light projection device 100 can directly illuminate the lost article. When the lost article cannot be illuminated directly, the light projection device 100 displays an illustration and characters for guiding the user 201 to the lost article. In FIG. 3, for example, the light projection device 100 guides the user 201 by use of the arrow mark and the characters. The image capturing sensor 104 captures an image of an area where the light projection device 100 can project light, and the controller section 105 recognizes a position corresponding to a human face. Herein, the controller section 105 controls an angle of the movable projector section 110 such that the light projected from the movable projector section 110 directly enters the human face. The structure for preventing projected light from directly entering human eyes can prevent a person from feeling dazzling.

Preferably, the light projection device 100 includes the image sensor 104, the image sensor 104 acquires a view field of the user 201, and the controller section 105 controls a position where an image is projected and controls display of an illustration and characters for guiding the user on the basis of a result of determination whether an image of a lost article can be captured. In the present embodiment, the illustration and the characters are projected onto the view field of the user 201. The view field of the user 201 is specified using the image capturing sensor 104, so that the illustration and the characters can be projected onto a preferable position where the user 201 can see the illustration and the characters effortlessly.

In the present embodiment, moreover, a lost article is illuminated directly, but cannot be illuminated directly in some cases. Therefore, the light projection device 100 determines whether to directly illuminate the lost article, by use of the image capturing sensor 104. Even in the case where the lost article cannot be illuminated directly, the light projection device 100 displays a guide illustration to appropriately guide the user to the article. Thus, even in the case where the article is in any site where the lost article cannot be illuminated directly, specifically, even in the case where the lost article is in a drawer or is hidden behind a different article, the light projection device 100 can guide the user 210 to the lost article. In particular, the example shown in FIG. 3 is preferable in that the approximate position of the lost article is illuminated, and the precise site of the lost article is specified with an illustration and characters. This display method involving not only guiding the user by use of the illustration and the characters, but also projecting light onto the approximate position of the lost article makes it possible to guide the user 201 to a specific site, to narrow down the range for searching, and to define the meaning indicated by the illustration and characters.

Figure 4:
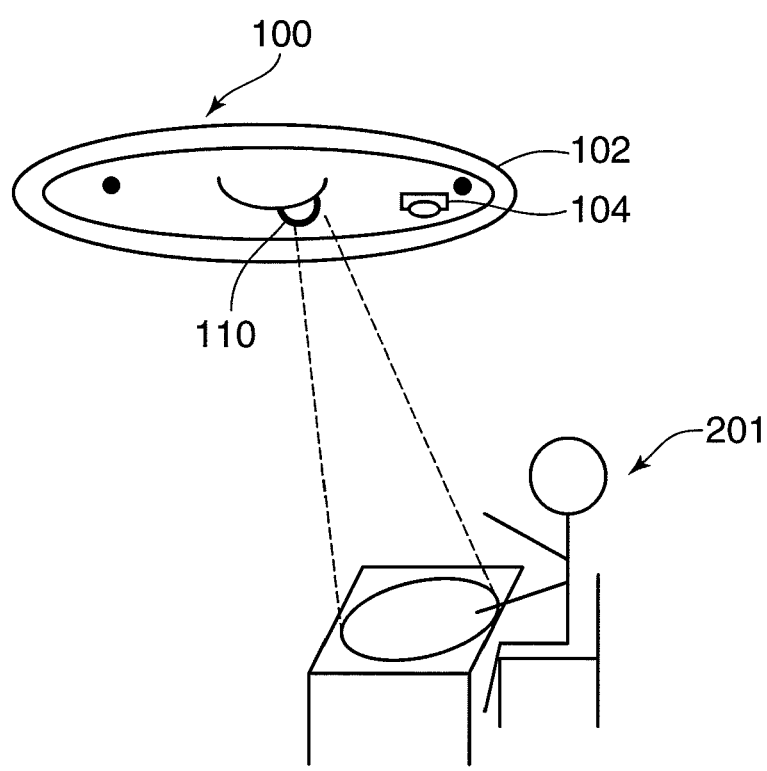
FIG. 4 shows a schematic structure and operations of the light projection device according to one embodiment of the present invention.

FIG. 4 illustrates a state in which the light projection device 100 projects light onto a desk which falls within the view field of the user 201. In this case, the user does not search for an article, but reads a book by utilizing the projected light. The light projection device 100 controls a light projecting direction in a variable manner, and changes the light projecting direction each time the view field of the user 201 changes. The controller section 105 of the light projection device 100 acquires the direction information corresponding to the view field of the user 201 from the image capturing sensor 104, and controls the movable projector section 110 such that the movable projector section 110 changes the light projecting direction. Herein, the light projecting direction may be shifted to a site designated by the user 201 by voice.

Preferably, the light projection device 100 controls a position, on which light is projected, in a variable manner and illuminates a site which falls within a view field of the user 201. By use of such a characteristic that the light projection position is variable, the light projection device 100 can illuminate a specific article (e.g., a lost article) and, further, can illuminate a position in a view field of the user 201. The light projection device 100 illuminates the specific position in the view field of the user 201 to locally illuminate the site in the view field of the user 201, i.e., a site where the user 201 wants to see or a site where the user 201 wishes a third person to see. The local illumination of the view field of the user 201 is lower in power consumption than global illumination. Moreover, the local illumination produces an effect of concentrating consciousness of the user 201 onto the illuminated range.

In the light projection device 100, the movable projector section 110 projects light onto a certain range, and the diffusion light source 102 illuminates the entire room in which the main body 101 is installed. As described above, the light projection device 100 serves as a lighting fixture for a room, and adjusts illuminance of the entire room. The level of illuminance in the entire room is adjusted by the diffusion light source 102, and the specific site in the view field of the user 201 is illuminated using the light projected from the movable projector section 110.

The light projection device 100 has the diffusion light source 102. Preferably, the light projection device 100 illuminates the indoor place with diffused light. By virtue of the diffusion light source 102, the light projection device 100 serves as a lighting fixture capable of adjusting the illuminance of the entire room. Thus, the light projection device 100 can adjust the illuminance suitable for the user 201. As described in the present embodiment, particularly, the light projection device 100 has the function of illuminating the specific site with projected light and the function of illuminating the entire room with diffused light, and therefore can freely control the contrast and average level of the illuminance. Herein, the diffusion light source 102 may be a light source in which laser light is diffused satisfactorily, an LED, a fluorescent lamp, or the like.

FIG. 5 illustrates a state in which the light projection device 100 projects an image of information designated by the user 201 onto a wall which falls within a view field of the user 201. As shown in FIG. 15, the light projection device 100 is connected to a network (e.g., a LAN (Local Area Network)) or the Internet through the input/output interface section 107. In the light projection device 100, the controller section 105 retrieves the information designated by the user 201 with voice input, from the network. Then, the controller section 105 controls the movable projector section 110 such that the movable projector section 110 projects the image of the retrieved information. In the example shown in FIG. 5, when the user 201 inputs by voice "What is tomorrow's weather like?" to the light projection device 100, the light projection device 100 projects an image of a tomorrow's weather forecast onto a wall which falls within a view field of the user 201. The light projection device 100 controls an image projecting direction in a variable manner, and changes the image projecting direction to a site which falls within the view field of the user 201. The controller section 105 of the light projection device 100 acquires the direction information corresponding to the view field of the user 201 from the image capturing sensor 104, and controls the movable projector section 110 such that the movable projector section 110 changes the image projecting direction. Herein, the image projecting direction may be shifted to a site designated by the user 201 with a voice. Moreover, the image to be projected is an image designated by the user 201 with a voice. The light projection device 100 has the voice sensor 103, and the voice sensor 103 allows the voice input. Alternatively, the voice sensor 103 may be replaced with an interface that does not employ voice input (e.g., a keyboard).

Preferably, the light projection device 100 controls a position where light is projected in a variable manner and projects an image of information designated by the user 201 onto a view field of the user 201. The light projection device 100 makes use of the characteristic that a projection position is variable to project an image onto a position which falls within a view field of the user 201. Herein, since the projected image is designated by the user 201, the user 201 can acquire requested information.

Moreover, since the projection position is variable and falls within the view field of the user 201, the user 201 can acquire information while doing a different task. In a conventional case of using a stationary display unit, a user needs to move to the display unit. On the other hand, the present embodiment eliminates such a necessity, and an image follows the user 201. In a conventional case of using a carrying display unit, a user needs to carry the display unit. On the other hand, the present embodiment eliminates such a necessity and the user does not necessarily carry a display unit. As described above, the light projection device 100 according to the present embodiment allows the user 201 to acquire information irrespective of a position of a display unit.

Moreover, the light projection device 100 projects light or an image and, simultaneously, changes a projection position, so that the light or the image is displayed while being moved in a spatial manner. Further, the light or image to be displayed is changed in a temporal manner as the light or image is moved. For example, in the case where no lost article exists in a view field of the user 201, the light projection device 100 projects illumination light (or an image) onto the view field of the user 201 to make the user 201 aware of the light. Then, the light projection device 100 gradually shifts the illumination light toward the lost article to allow the user 201 to direct his/her line of sight to the position of the lost article. Herein, the light projection device 100 may effect spot illumination in a circular shape. Alternatively, the light projection device 100 may project illumination light in an arrow mark shape for allowing the user 201 to direct his/her line of sight to the position of the lost article. The light projection device 100 shifts the illumination light to a position near the search target position, and then displays specific information about a state of the lost article (e.g., a position inside a desk). Thus, the light projection device 100 allows the user 201 to direct his/her line of sight to the lost article, allows the user 201 to intuitively recognize the position of the lost article, and promotes the understanding of the user 201 by the display of specific information. As described above, the light projection device 100 according to the present embodiment has a feature of shifting a projection position in a spatial manner and changing information to be displayed in a temporal manner. This feature allows the more intuitive understanding of the user 201 as compared with information displayed on a screen in a conventional manner.

Figure 6A:
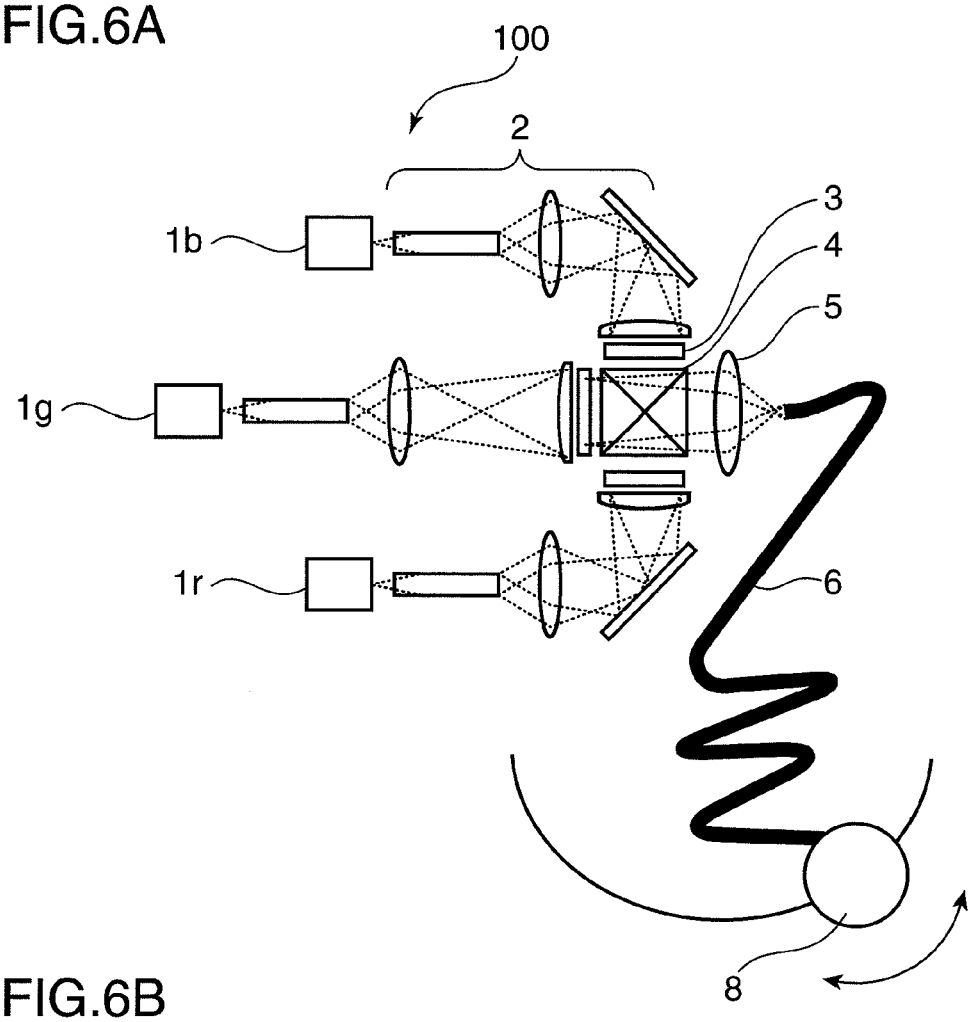
FIG. 6A shows a schematic structure of an optical system in the light projection device according to one embodiment of the present invention.

FIG. 6A shows a schematic structure of an optical system in the light projection device 100. Laser light sources 1r, 1g and 1b emit a red laser light, a green laser light and a blue laser light, an illumination optical system 2 shapes these light beams, and a spatial light modulation element 3 (light modulation section) is illuminated with the resultant light beams. In the light projection device 100, the illumination optical system 2 including a rod integrator and a relay lens shapes the laser lights in a rectangular shape and distributes the laser lights at uniform intensity such that the laser lights become suitable for illumination of the spatial light modulation element 3. The spatial light modulation element 3 includes a transmission liquid crystal element and a polarizer, modulates each laser light, and emits the laser light modulated in a two-dimensional manner. A multiplexing prism 4 multiplexes the modulated red, green and blue laser lights, and emits the resultant laser light to a scale-down projection optical system 5. The scale-down projection optical system 5 forms a scaled-down image based on the modulated laser light on an incident plane of a fiber bundle 6 (light guide member). In the fiber bundle 6, the modulated laser light is guided to each core.

The fiber bundle 6 has a structure that a plurality of fibers each having a core are tied in a bundle and each core is covered with a cladding which is lower in refractive index than the core. In the fiber bundle 6, the cladding is interposed between the cores. Herein, the cladding may be provided in a separate manner without being shared between the cores, and a different resin material or a gap may be interposed between the claddings. In the fiber bundle 6, arrangement of the cores on a light incoming side and arrangement of the cores on a light outgoing side are fixed, so that an image on the light incoming side can be transferred onto the light outgoing side. The fiber bundle 6 has bendability (flexibility), and therefore can be used as one line member together with a cladding. Preferably, the cladding between the cores is reduced in size as much as possible in order to improve extraction efficiency. A material and a shape of the fiber bundle 6 are not particularly limited as long as the fiber bundle 6 has a plurality of cores and can guide light.

Figure 6B:
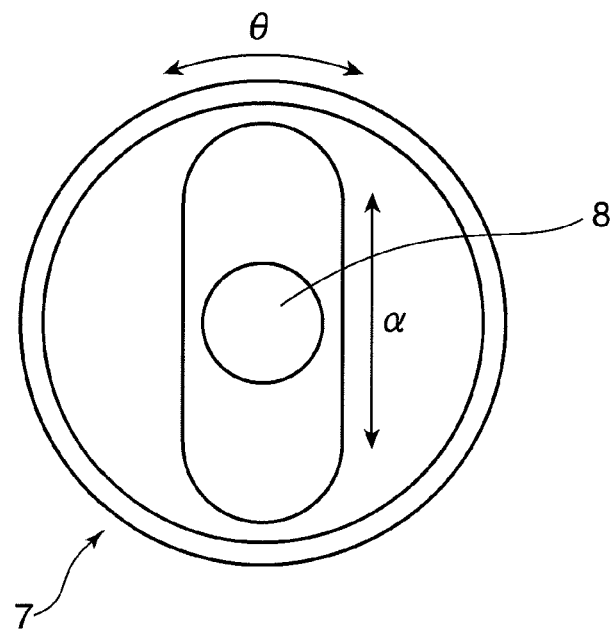
FIG. 6B shows a schematic structure of a movable projector section in the light projection device shown in FIG. 6A.

The fiber bundle 6 is coupled to a projection lens 8 on the light outgoing side, and the projection lens 8 projects the transferred image in an enlarged manner. As shown in FIG. 6B, the projection lens 8 is movable by a projection angle adjustment mechanism 7. The projection angle adjustment mechanism 7 makes variable a horizontal rotating direction θ and a tilt angle α of the projection lens 8, to change a projection angle. Thus, the light outgoing side of the fiber bundle 6 and the projection section formed by the projection lens 8 become movable to form the movable projector section 110 (movable section).

In the light projection device 100, the laser light sources 1r, 1g, 1b and the like are fixed, but only the projector section is movable to set the projection direction. The projection lens 8 has a zoom mechanism to change a projection size. Since the fiber bundle 6 is formed in a line member having bendability, the movable projector section 110 can freely be moved to a position set by the projection angle adjustment mechanism 7.

Preferably, the light projection device 100 has the movable projector section 110 that shifts a projection position in accordance with a position of an article and a view field of the user 201. The movable projector section 101 allows the shift of projection position, which is required in the present embodiment. In the light projection device 100 according to the present embodiment, moreover, only the portion including the projection lens 8 for projecting illumination light or an image is movable. This structure allows reduction in size of a movable section, which leads to miniaturization and speedup of a shift mechanism.

Preferably, the light projection device 100 includes the laser light sources 1r, 1g and 1b, the fiber bundle 6 having the plurality of cores which are fixedly arranged on the light incoming side and the light outgoing side, and the movable projector section 110 provided at the light outgoing side of the fiber bundle 6, guides a modulated laser light to the fiber bundle 6, and controls the movable projector section 110 such that the movable projector section 110 projects light emitted from the fiber bundle 6 in an enlarged manner and shifts a projection position. The movable projector section 110 is formed only by the projection lens 8 and the light outgoing end surface of the fiber bundle 6, which leads to size reduction and weight reduction of the movable section. Thus, the projection angle can be adjusted quickly with a small force. Moreover, since the fiber bundle 6 is a line member having bendability, the movable projector section 110 can be operated freely. Further, the laser light sources 1r, 1g and 1b allow improvement in coupling efficiency to the fiber bundle 6, and also allow highly efficient light transmission.

Preferably, a light source to be used in the light projection device 100 according to the present embodiment is a laser light source. Herein, when the laser light source to be used is small in area, the movable projector section 110 can be reduced in size. Since the movable projector section 110 is reduced in size, a drive mechanism for the movable projector section 110 can be reduced in size and power consumption in operation can be suppressed. In the present embodiment, preferably, the laser light sources 1r, 1g and 1b for emitting a red laser light, a green laser light and a blue laser light are used as a light source to achieve full-color image display; however, the light projection device 100 according to the present embodiment is not limited to this structure. For example, the laser light source to be used herein may emit a single color laser light or two color laser lights.

In the present embodiment, position information of an article is detected using the wireless identification tag 130. However, the wireless identification tag 130 may not be used as long as a mechanism is provided for detecting position information of an article without using the wireless identification tag 130 and transmitting this information to the light projection device 100. For example, position information of an article, which is detected by the image capturing sensor 104, may be transferred to the light projection device 100. Moreover, a scheme other than voice input may be employed for in the case where the user 201 inputs by voice a command to search for an article. Herein, the user 201 may use a typical known input unit such as a keyboard, a pointing device or a touch panel.

Second Embodiment

Next, a light projection device according to another embodiment of the present invention will be described herein below with reference to the drawings.

Figure 7:
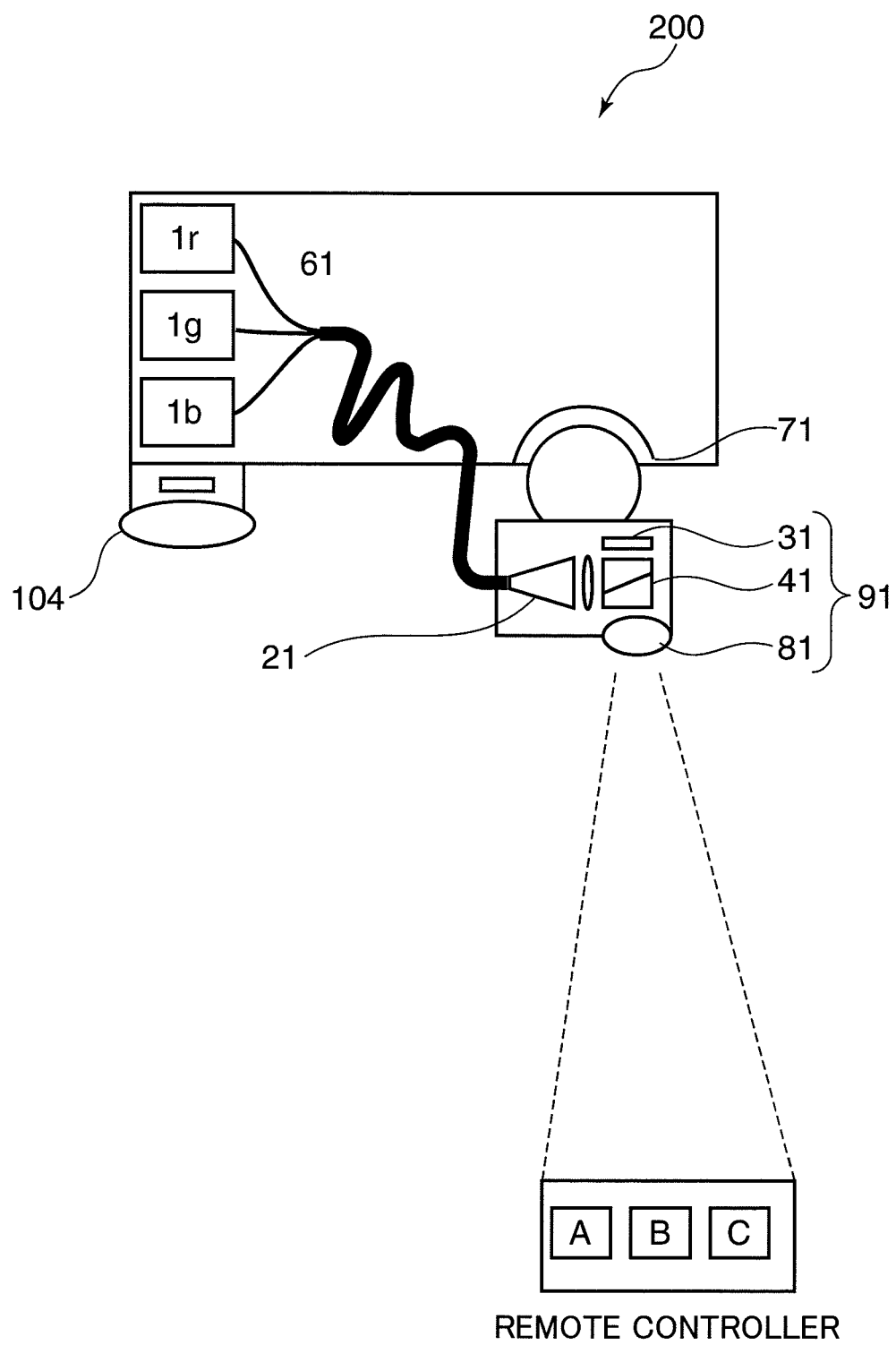
FIG. 7 shows a schematic structure and operations of a light projection device according to one embodiment of the present invention.

FIG. 7 schematically illustrates a structure and operations of an optical system in a light projection device 200 according to the second embodiment of the present invention. In the second embodiment, constituent members similar to those described in the first embodiment are denoted with the identical reference numerals; therefore, detailed description thereof will not be given here.

In the light projection device 200, laser light sources 1r, 1g and 1b are separated from a movable projector section 91 (movable section), and a multimode fiber 61 connects between each laser light source and the movable projector section 91. The laser light sources 1r, 1g and 1b emit red, green and blue laser lights to the multimode fiber 61 (light guide member), and the multimode fiber 61 transmits the laser light to an illumination optical system 21 in the movable projector section 91. The multimode fiber 61 has bendability (flexibility). Therefore, even in the case where the movable projector section 91 is moved, the multimode fiber 61 can continuously connect between the movable projector section 91 and each of the laser light sources 1r, 1g and 1b.

In the present embodiment, the multimode fiber 61 is a quartz-based fiber having a structure that three multimode fibers corresponding to a red laser light, a green laser light and a blue laser light are coupled to one multimode fiber having a large diameter. The material for the multimode fiber 61 is not limited to quartz-based material, and for example, resin or other materials can be used as long as those which have some flexibility and which are capable of transmitting the power of the laser light. For the multimode fiber 61, a bundle of fibers respectively transmitting lights in respective colors, or a multicore fiber having a plurality of cores.

The movable projector section 91 is made up of an illumination optical system 21, a reflective spatial light modulation element 31, a TW (Total Internal Reflection) prism 41, and a projection lens 81. The movable projector section 91 changes its light projecting direction by the projection angle adjustment mechanism 71. The projection angle adjustment mechanism 71 adjusts the angle of two axes by moving a ball-shaped plinth, and to move the projection position by the movable projector section 91.

The illumination optical system 21 includes a taper rod prism and a field lens. The taper rod prism has a light incident surface connected to the multimode fiber 61, a taper side face which reflects light to be superimposed, and a light output face which determines the beam shape. The taper rod prism has functions of shaping light beams and making the intensity of the light beams uniform.

The TIR prism 41 reflects light from the illumination optical system 21 from the reflective spatial light modulation element 31, while transmitting therethrough the light reflected to the projection lens 81. For the reflective spatial light modulation element 31, adopted is a DMD (Digital Micromirror Device). The reflective spatial light modulation element 31 performs light modulation by switching an angle of a micromirror.

The light projection device 200 has a preferable structure which includes a movable unit (movable projector section) 91 which is made up of an illumination optical system, a light modulation element, and a projection optical system, a laser light source, and a flexible optical transmission section (multimode fiber 61) that connects the laser light source and the movable unit, wherein the projection position is controlled by the movable unit. With the foregoing structure of connecting the light source and the movable unit by the flexible optical transmission section, it is possible to maintain the connection between the light source and the movable unit without being affected by the movement of the movable unit, while permitting the separation of the light source from the movable unit. With this structure of separately providing the light source and the movable unit, it is possible to reduce the size of the movable unit (movable projector section 91), which in turn makes it possible to reduce the projection position moving mechanism as required in the present embodiment, and the reduction in power consumption of the driving mechanism. The foregoing structure with a separately provided light source section of the present embodiment is especially preferable especially for controlling the projection position with the structure adopting the high power light source, wherein a large size heat releasing mechanism for the light source is required, which increases the size of the light source section.

In addition to the function of searching for an article, the light projection device 200 may have interactive functions, so that the light projection device 200 can be a substitute for the article the user 201 is searching for. FIG. 7 shows an example where the user 201 searches for a remote-controller for TV. In this example of FIG. 7, even if the remote-controller does not exist in the main room where the light projection device 200 is installed, the light projection device 200 may be arranged so as to project an image of the remote-controller (interactive image) in the view field of the user 201. In this way, the image of the remote-controller as projected can serve as the remote-controller. The foregoing interactive function between the information (the remote-controller image in this example) projected by the light projection device 200 and the user 201 can be realized by the operations with respect to the information by the user 201, and the operations performed by the controller section 105 which execute the processes corresponding to the operations performed by the user 201. Here, the operations with respect to the information as projected are detected in the following manner. The operated condition by the user 201 can be detected in the following manner. That is, the operation conditions by the user 201 are captured by the image sensor 104, and the image as captured is processed by the controller section 105 (see FIG. 15), thereby detecting the operated condition. For example, in the case where the user 201 operates so as to point out with his/her finger the channel button in the image of the remote-controller, the operated condition is captured by the image sensor 104, and the channel button position under the finger of the user 201 is obtained by carrying out the image processing by the controller section 105. In this case, the light projection device 200 is arranged such that the controller section 105 controls to change the channel of the TV by wireless transmission via the input/output interface section 107, the interactive functions can be realized. The present embodiment has a preferable structure wherein the light projection position can be changed, and the interactive image for controlling the device is projected onto the position indicated by the user 201. The image of the situation where the user 201 touches with his/her finger the projected image is captured by the image sensor 104, to control the device.

The light projection device 200 of the present invention is arranged so as to change the light projection position. It is therefore possible to display image having the interactive function at an appropriate position with respect to the operator. Incidentally, since the projection position is controlled by the light projection device 200, it is possible to carry out the sensing for projected position of the information by using the image sensor 104.

The light projection device 200 of the present invention carries out search for the lost article as in the foregoing preferred embodiments. Additionally, the light projection device 200 has an interactive function to be substituted for the remote-controller when carrying out the search for the remote-controller or other device controller. In this way, since the device controller such as the remote-controller becomes no longer necessary, it is possible to save time and effort for the search. The control by means of voice recognition has been proposed as a substitute for a physical device controller such as a remote-controller. However, such voice recognition is not suitable in the case where operations are performed frequently. In response, the present invention is arranged so as to display information having the interactive function at the position as desired, it is possible to perform frequent operations with ease, and the user 21 performs operations comfortably.

The image sensor 104 is incorporated into the movable projector 91. This image sensor 104 may be formed coaxially with the special light modulation element 31, and the projection lens 81 may be used as the image lens.

Incidentally, it may be arranged such that an infrared ray is superimposed on the projected information so that the sensing by the interactive function can be carried out with ease. In the present embodiment, the wavelength conversion laser is adopted for the green laser light source 1g, and a green light and an infrared ray are output from the green laser light source 1g. Specifically, the green laser light source 1g performs a wavelength conversion of the infrared ray as a fundamental laser light by the wavelength conversion element, to generate a green light (wavelength converted laser light). The green laser light source 1g outputs the infrared ray which remains without being converted into a harmonic wave together with the green light. The infrared ray is typically cut by a filter, etc. However, for the structure without such filter, the infrared ray is also output with the green light in the same light path. In this case, it is preferable that the infrared ray and the operation by the user 201 as projected are detected by adopting the infrared camera for the image sensor 104. As described, by carrying by the sensing by capturing image by the infrared camera, it is possible to distinguish the interrupting to the projected image due to the user's operation or due to other article with ease. As a result, the sensing of the interactive function with respect to the operation by the user can be performed with an improved precision.

Third Embodiment

Next, a light projection device according to still another embodiment of the present invention will be described herein below with reference to the drawings.

FIG. 8A schematically shows the schematic structure and operations of an optical system in a light projection device 300 according to the third embodiment of the present invention. In the third embodiment, for members having the same functions as those of the foregoing embodiments are denoted with the same reference numerals; and detailed explanations will be appropriately omitted here.

The light projection device includes a portable light projection device 310 (compact light projection unit) and a movable stage stand 350 which controls the projection direction. The portable light projection device 310 and the movable stage stand 350 are detachable. The portable light projection device 310 functions as a projecting device even in the state detached from the movable stage stand 350.

The movable stage stand 350 has a charge stage 301. This charge stage 301 is provided for fixing and charging the portable light projection device 310. To the 350, power is supplied from the power supply plug, for charging the portable light projection device 310 by the charge stage 301. The portable light projection device 310 can be set to the charge stage 310 and fixed to the movable stage stand 350 when the user wishes it to be charged or to be used indoor.

The movable stage stand 350 includes a projection angle adjustment mechanism 72, and the charge stage 301 can be freely inclined by bi-axially moving a globular plinth. With this charge 310 which can be inclined bi-axially, it is possible to move the projection position of the portable light projection device 310 in the state fixed to the movable stage stand 350, or to directly illuminate the article which the user searches for, or to project an illustration of characters within the view field of the user 201 as explained in the foregoing first and second embodiments.

As shown in FIG. 8B, the portable light projection device 310 includes laser light sources 1r, 1g and 1b, a cross prism 9, an illumination optical system 22, a reflective special light modulation element 23 and polarized light beam splitter (PBS) 42 and projection lens 82. The red, green and blue laser lights emitted from the laser light sources 1r, 1g and 1b are combined by the cross prism 9, to be incident into the illumination optical system 22. The illumination optical system 22 includes an orthogonal lenticular lens 22a and an extension corner compensation lens 22b which cross at right angles. This illumination optical system 22 makes the intensity of the light beams uniform, and shapes the light beams. The reflective special light modulation element 32 includes a minute LCOS (Liquid Crystal On Silicon), and modulates by time division the red, green and blue laser lights as emitted sequentially. The PBS 42 separates unnecessary polarized beams, and applies gradation to the image to be projected. The projection lens 82 performs an extended projection of the modulated light onto the projection position.

Figure 20:
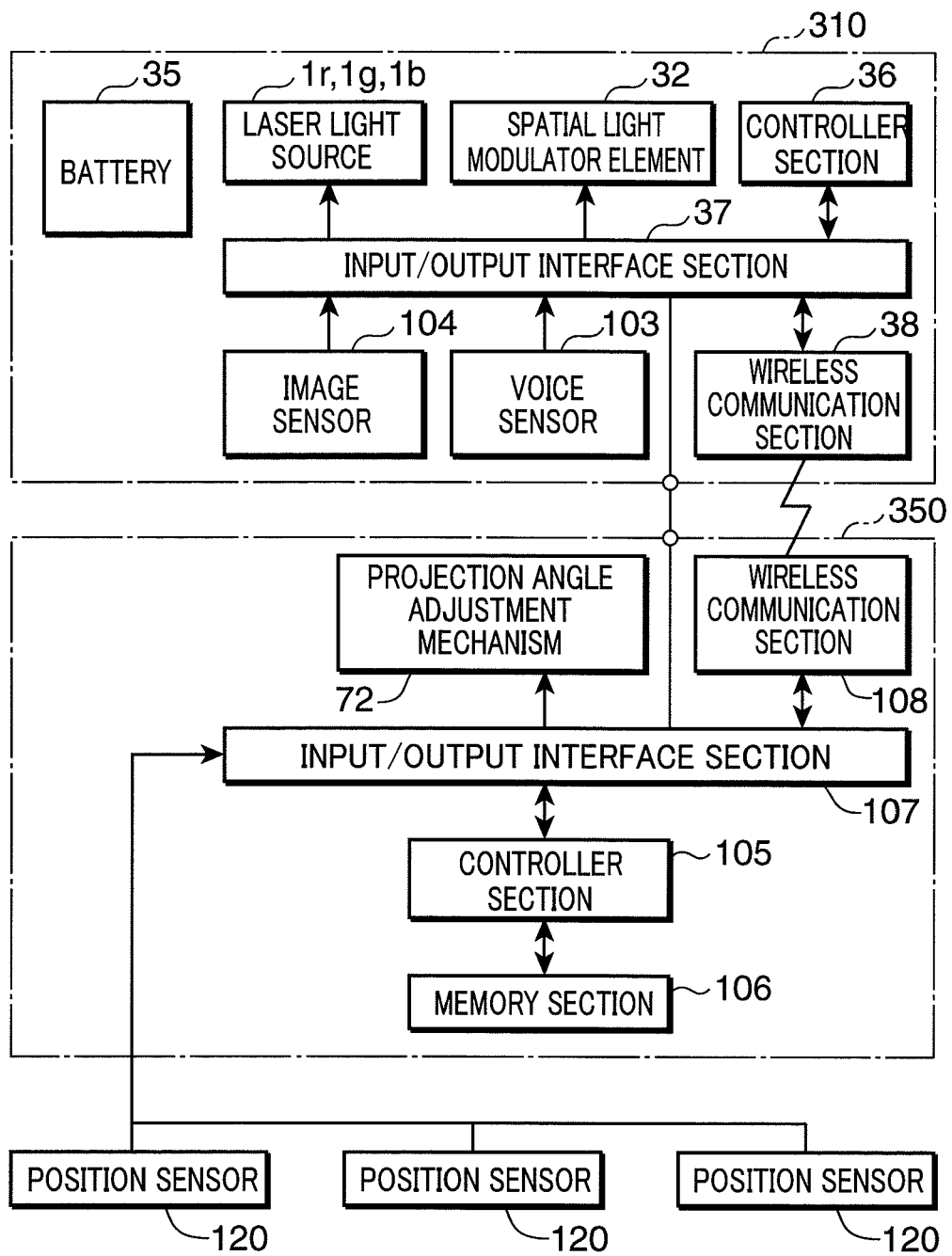
FIG. 20 shows a block diagram showing schematic structure of the light projection device according to one embodiment of the present invention.

Other than the described optical system, as shown in FIG. 20, the portable light projection device 310 includes battery 35, the controller section 35, an I/O interface 37, a radio communication section 38, voice sensor 103 and an image sensor 104. For the battery 35, for example, the lithium-ion secondary battery, etc., may be used. The controller section 36 controls the laser light source 1r, 1g and 1b and the reflective spatial light modulation element 32 by the I/O interface 37. When the portable light projection device 310 is separated from the movable stage stand 350, the radio communication section 38 performs wireless communication with respect to the movable stage stand 350.

Moreover, as shown in FIG. 20, the movable stand 350 also includes the controller section 105, the memory section, the memory section 106, the I/O interface section 107, and the radio communication section 108 as shown in FIG. 20.

According to the foregoing structure wherein a control signal and data are exchanged between the portable light projection device 310 and the movable stage stand 350 by wireless communication, when the portable light projection device 310 is separated from the movable stage stand 350, the portable light projection device 310 can operate alone.

When fixing to the charge stage 301, the portable light projection device 310 becomes movable by the incident angle adjustment mechanism 72 of the movable stage stand 350. The portable light projection device 310 corresponds to the movable projector section of the present invention. In this case, as in the case of the first and second embodiments, the projection direction, etc., is determined based on the position information of the lost article. The portable light projection device 310 serves as the movable projection section of the present invention. In this case, the portable light projection device 310 determines the projection direction, etc., based on the position information of the lost article, the allowance of capturing article image, the view field information of the instructor 201.

On the other hand, when the portable light projection device 310 is separated from the movable stage stand 350, the projection direction of the portable light projection device 310 is under the control of the user 201. In this case, the portable light projection device 310 projects and displays the guide information indicative of the position of the article with illustration, or the like, in the projection direction as the user 201 desires (see FIG. 2).

Next, one example for the effective applications of the light projection device 300 is shown. Firstly, the search for the lost article is executed with the portable light projection device 310 set in the movable stage stand 350. Then, if the article doesn't exist in the main room where movable stage stand 350 is set up, the guide information, which indicates that the subject article exists in another room, is projected and displayed by the portable light projection device 310. In this case, user 201 separates the portable light projection device 310 from the movable stage stand 350. Then, the user 201 moves to another room while carrying the portable light projection device 310. In the room he/her moves to, the user 201 checks again the guide information projected by the portable light projection device 310. When the guide information projected by the main room is moved to another room, the user 201 can confirm the guide information again in the room he/her moves to. Therefore, even when the article exists in which indoor room, it can more certainly search for the lost article.

According to the structure of FIG. 20, it is possible to assist for the search of an article by the portable light projection device 310 even when the portable light projection device 310 is separated from the movable stage stand 350. However, the present embodiment is not limited to the foregoing structure. Namely, in the state where the portable light projection device 310 is separated from the movable stage stand 350 and the assist for the search of the article with the portable light projection device 310 is not possible, it may be arranged such that the portable light projection device 310 still maintain the function of illuminating light, etc., by the light projection. In this case, a set of the voice sensor 103, the image sensor 104, the controller section 105, the memory section 106, and the I/O interface part 107 are provided on the side of the movable stage stand 350. Since the foregoing structure does not necessarily require the radio communication, it is possible to still reduce the portable light projection device 310. Incidentally, for the image sensor 104, by providing it on the side of the portable light projection device 310, it is possible to change the image capturing range.

The light projection device 300 has the described preferable structure comprising the compact light projection device (portable light projection device 310), and the movable stage stand which controls the projection direction of the compact light projection device, wherein the compact light projection device is operable alone in the state separated from the movable stage stand, and the movable stage stand has a function of charging the compact light projection device. With the beneficial feature being small of the compact optical projection device, it is possible to instantly move the projection position by means of the movable stage with a small power.

Furthermore, since the compact light projection device is operable alone, it is possible to use it as the light projection device in a room different from the room where the movable stage stand is installed. In the state where the compact light projection device is separated from the movable stage, the compact light projection device can be operated by battery. Namely, the compact light projection device can be used in a variety of locations for various purposes. In this case, since the compact light projection device can be charged by the movable stage stand, it is possible to use the compact light projection device for the purposes described in the present embodiment continuously for a long time.

According to the structure of the present embodiment, even immediately after the compact light projection device has been used for the article search, the compact light projection device can be separated from the movable stage stand to be charged by the movable stage stand. Therefore, the compact light projection device can be used in a variety of locations for various purposes. Furthermore, by installing the movable stage stand in the room where the compact light projection device is installed, the compact light projection device can be used with hand free in that room. With this movable stage stand, the installation position of the compact light projection device is set to a specific position. The location of the compact light projection device never becomes unclear. Furthermore, the movable stage stand of the present embodiment can be used also as the charge for charging the compact light projection device when carrying it to the outside of the room.

Fourth Embodiment

Next, a light projection device according to yet another embodiment of the present invention will be described herein below with reference to the drawings.

Figure 9:
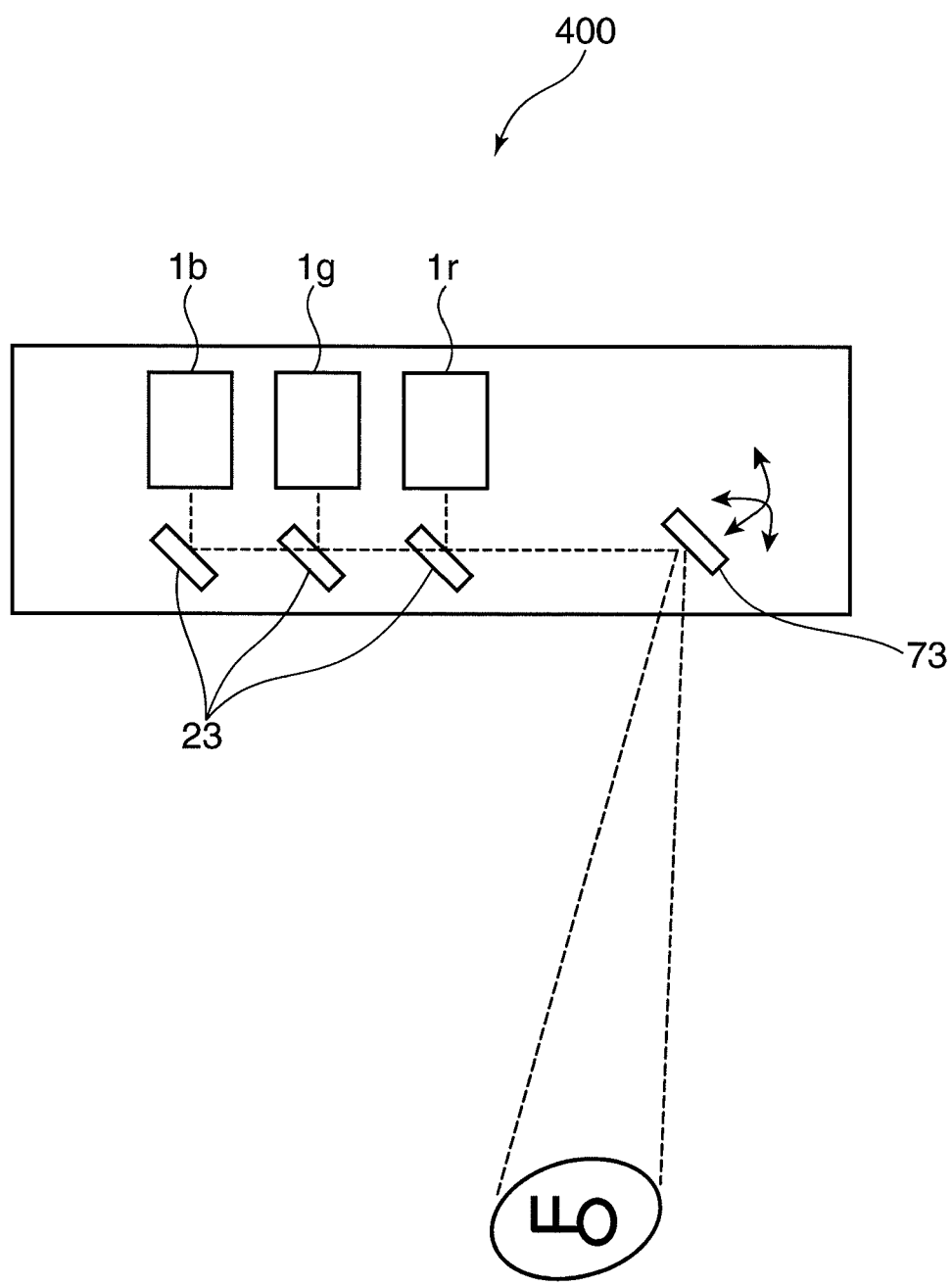
FIG. 9 is an explanatory view showing the structure and operations of the light projection device according to one embodiment of the present invention.

FIG. 9 schematically shows the structure of a light projection device 400 according to the fourth embodiment of the present invention. In the fourth embodiment, for members having the same functions as those of the foregoing embodiments are denoted with the same reference numerals; and detailed explanations will be appropriately omitted here.

The light projection device 400 adopts a scanning mirror 73 (movable mirror) for the movable projecting section. The projecting direction is controlled by the scanning mirror 73 which has a function of scanning bi-axially to directly illuminate the position where a subject article exists. The present embodiment has characteristic feature that the spatial modulation of light indicative of an illustration or characters is carried out by the light intensity modulation for the laser light sources $1r$, $1g$ and $1b$, and scanning by the scanning mirror 73.

The red, blue and green laser lights respectively emitted from the laser light sources $1r$, $1g$ and $1b$ become coaxial beams by the dichroic mirror 23, to be incident onto the scanning mirror 73. For the scanning mirror 73, a MEMS (Micro Electro Mechanical System) mirror which is capable of scanning bi-axially is adopted to bi-axially scan light. The intensity of the laser lights are modulated by the laser light sources $1r$, $1g$ and $1b$, and illustrations or characters are projected with a combination of the scanning by the scanning mirror 73. Here, with the scanning mirror 73, the projecting direction is controlled based on a scanning angle so that the projection direction can be moved as desired. In the example of FIG. 9, the scanning angle by the scanning mirror 73 is controlled so as to directly illuminate only the spot of position where the key subjected to search exits.

Alternatively, the present embodiment may be arranged so as to adopt a spatial modulation element for special modulation of light beams, and adopts a movable mirror for controlling the light projection direction. In this case, the movable mirror is installed in the latter stage of the projection lens of the light projection device. With this movable mirror, the modulated light beams output from the projection lens are bi-axially scanned, to determine the projection direction of the light beams.

The present embodiment has a preferable embodiment in that the projection direction is controlled by the movable mirror. With this movable mirror, the projection direction can be controlled with ease, and the moveable section can be reduced in size. In particular, according to the light projection device 400, the scanning mirror is fairly compact in the size of μm order. With such compact movable section, the power consumption of the device can be saved.

Fifth Embodiment

Next, a light projection device according to yet another embodiment of the present invention will be described herein below with reference to the drawings.

Figure 10:
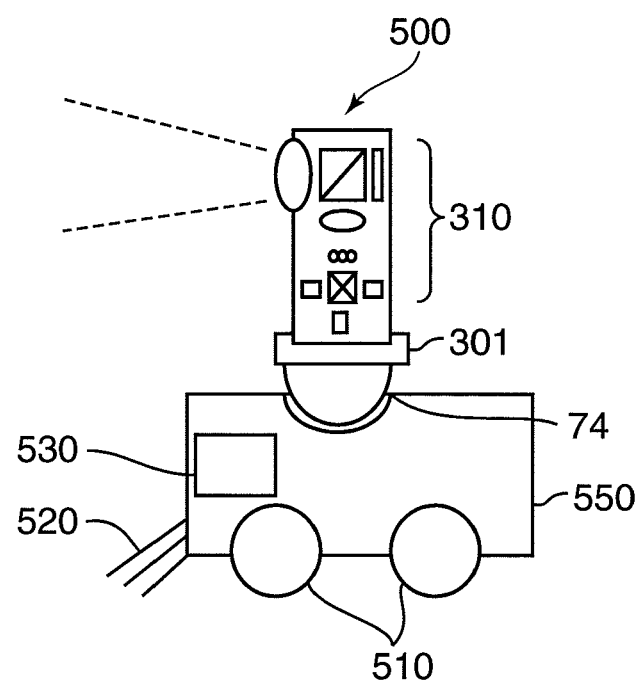
FIG. 10 shows a schematic structure of the light projection device according to one embodiment of the present invention.
Figure 11:
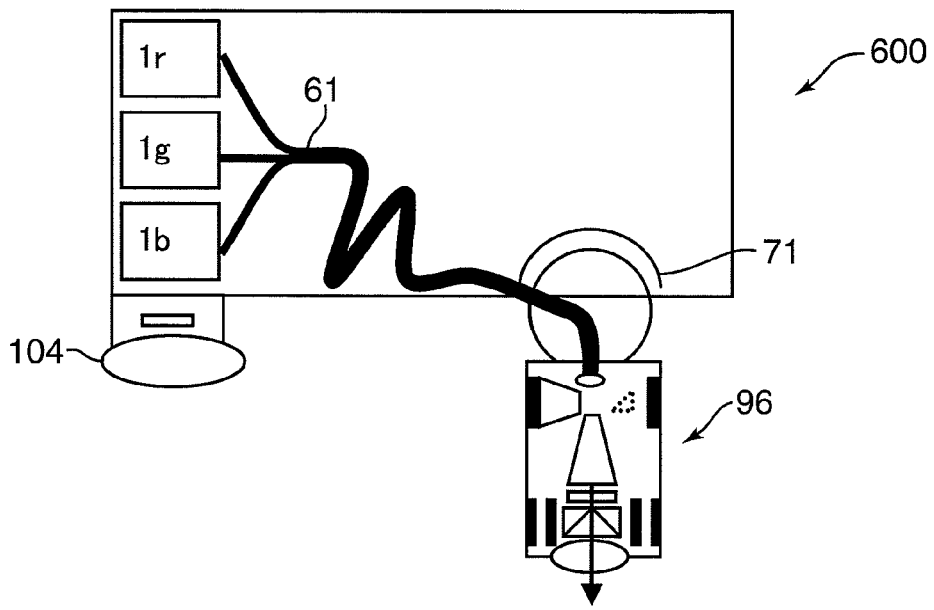
FIG. 11 shows a schematic structure of the light projection device according to one embodiment of the present invention.

FIG. 10 schematically shows the structure of a light projection device 500 according to the fifth embodiment of the present invention. In the fifth embodiment, for members having the same functions as those of the foregoing first through fourth embodiments are denoted with the same reference numerals; and detailed explanations will be appropriately omitted here.

A light projection device 500 includes a self-propelled stage 550 provided with a compact light projecting section 310 (light projection unit), a charge stage 301 for use in controlling the projection direction, a projection angle adjustment mechanism 74 and wheels 510 for self propulsion.

As shown in FIG. 8B, the compact light projecting section 310 includes laser light sources 1r, 1g and 1b, and spatial modulation element 32. The compact light projecting section 310 projects modulated light from the projection lens 82. As shown in FIG. 10, the projection angle adjustment mechanism 74 is provided on the part of the upper surface of the self-propelled stage stand 550. Further, the charge stage 301 is mounted to the angle adjustment mechanism 74. In the present embodiment, the charge stage 301 and the projection angle adjustment mechanism 74 serves as a movable stage for controlling the projection direction. The charge stage 301 has a function of connecting the compact light projecting section 310 to the projection angle adjustment mechanism 74. The projection angle adjustment mechanism 74 is a uniaxial adjustment mechanism that adjusts the projection angle in the vertical direction in the Figure. As in the case of the foregoing third embodiment, the compact light projecting section 310 of the present embodiment is detachable with respect to the charge stage 301. However, unlike the case of the third embodiment, the compact light projecting section 310 of the present embodiment is not necessarily be detachable from the charge stage 301. Incidentally, the projection angle adjustment mechanism 74 of the present embodiment is not necessarily be uniaxial, and biaxial projection angle adjustment mechanism may be equally adopted.

In the case where the compact light projecting section 310 of the present embodiment is detachable with respect to the charge stage 301 as in the case of the third embodiment, the compact light projecting section 310 can be provided with the battery 35, the controller section 36, the I/O interface 37, the radio communication section 38, the voice sensor 103, and the image sensor 104 as shown in FIG. 20. In this case, the self-propelled stage stand 550 can be provided with the controller section 105, the memory section 106, the I/O interface section 107, and the radio communication section 108 as in the case of the movable stage stand of the third embodiment.

On the other hand, in the case where the compact light projecting section 310 is fixed to (undetachable from) the charge stage 301, a set of the voice sensor 103, the image sensor 104, the controller section 105, the memory section 106, and the I/O interface part 107 can be provided on the side of the self-propelled stage stand 550. With this structure, it is possible to reduce the size of the compact light projecting section 310, and to adjust the light projection angle with ease. As a result, the power consumption can be saved. Incidentally, the image sensor is preferably provided on the side of the compact light projecting section 310 as the image capturing range can be changed with ease.

Further, the self-propelled stage stand 550 includes a battery for power supply (lithium-ion secondary battery etc.), an electric motor as a power supply, a wheel driving mechanism for transmitting the power from the electric motor to the wheels 510, and the like, and permits the self propulsion of the light projection device 500. The wheels 510 of the self-propelled stage stand 550 are operated based on the instructions from the user 201 or using the automatic-program by the movement control mechanism provided in the light projection device 500, and enable the self propulsion of the light projection device 500. The projection angle in the horizontal direction in the figure is adjusted by moving and rotating the light projection device 500 with wheels 510.

The light projection device 500 transmits ID information indicative of the self position, like the wireless identification tag 130 transmits the ID information. The ID information that the light projection device 500 transmits is received with the position detection sensor 120, and its self position is operated by the controller section 105 of the light projection device 500. Namely, the light projection device 500 is capable of identifying its self position as well as the position of the article having attached thereto the wireless identification tag 130. With this structure, even when the position of the light projection device 500 is changed by self propulsion, an absolute position (spatial coordinates) of the light projection device 500 can be obtained any time under stable conditions.

The light projection device 500 has a preferable structure provided with the movable stage for controlling the light projection direction and the self-propelled function that permits the projection position to be controlled as desired. In view of the feature that the subjected article for the search is illuminated directly, it is preferable that the light projection device 500 be mounted to a ceiling or the like with no obstacles for projection. However, it is not necessarily that the light projection device 500 be mounted to a ceiling or the like with no obstacles for projection, because the light projection device 500 has a self-propelled function to avoid obstacles in any, so as to ensure the direct illumination of the subject article for the search and the projection of drawings or characters within the view field of the user. As described, the light projection device 500 of the present embodiment is capable of always identifying the self position while carrying out the self propulsion. Therefore, it is possible to calculate in real time the relative position of the lost article for the search with respect to the self position of the light projection device 50 which moves by self propulsion. As a result, the light projection device 500 is capable of moving by itself while taking various roles to avoid the obstacles to surely reach to the lost article for the search. Therefore, the light projection device 500 can be placed on a floor, for example, where many obstacles exist. Furthermore, with the described self-propelled function, the projection position can be controlled as well as the projection angle, and an increased range for the projection area can be realized.

To realize the foregoing self-propelled function, the light projection device 500 may be provided with an image sensor, for example. With this structure, the light projection device 500 captures an image of a forward view in its moving direction by the image sensor 104 while being moved. Then, the light projection device 500 can recognize the obstacle if any as a result of making an analysis on the captured image by the controller section 105. The foregoing function of detecting an obstacle can be realized, for example, by projecting light in ahead of the light projection device 500 in the moving direction and detecting an obstacle by detecting the light reflected from the obstacle, or projecting supersonic wave, and detecting an obstacle by detecting the supersonic wave reflected from the obstacle. The foregoing obstacle detection method cay be used in replace of the detection method using the image sensor 104, or in combination with the image sensor 104.

The light projection device 500 includes a cleaning section 520 and a storage section 530. The cleaning section 520 has a function of storing the lost article for the search in the storage section in addition to the function of cleaning a room.

The cleaning section 520 has a suction mechanism and a dust storage section provided in the self-propelled storage stand 550. The light projection device 500 may be arranged so as to carry out cleaning operations based on the user's instructions. However, the light projection device 500 can be functioned as a so-called "automatic cleaner robot" which is capable of automatically cleaning a room by executing an automatic program.

It may be arranged so as to use the suction mechanism for the cleaning function of the cleaning section 520 when storing the target obstacle for the search in the storage section 530. In this case, it is preferable that a switch value be provided for switching a passage for the suction target. With this structure, it is possible to store dusts as sucked while cleaning operations are being carried out. On the other hand, when the lost article for the search is to be sucked, the passage for the suction target can be switched by the switch valve so that the lost article can be stored in the storage section.

For example, when the light projection device 500 encounters the article having attached thereto the wireless identification tag 130 that can be a search article candidate while the room is being cleaned, the light projection device 500 stores the search article candidate in the storage section 530. When the user 201 indicates the lost article, the light projection device 500 moves by itself to the position of the lost article if it locates in the area the cleaning section 520 can access. The light projection device 500 then stores the article in the storage section 530 by means of the cleaning section 201, and moves to the user 201 to carry it. The light projection 500 may be arranged so as to carry the lost article to the place indicated by the user 201 beforehand after storing it in the storage section 530.

The light projection device 500 of the present embodiment has a preferable structure provided with the self-scanning function, the cleaning section 520, and the storage section 530.

By storing the lost article in the storage section 530 beforehand, it is possible to save time for the search. Moreover, the light projection device 500 may be arranged so as to make a direct access to the lost article and move the article to carry out the search operation of the lost article.

Sixth Embodiment

Next, a light projection device according to yet another embodiment of the present invention will be described herein below with reference to the drawings.

FIG. 11 through FIG. 14 schematically show the structure of a light projection device 600 and members constitute the device according to the fifth embodiment of the present invention. In the fifth embodiment, for members having the same functions as those of the foregoing first through fifth embodiments are denoted with the same reference numerals; and detailed explanations will be appropriately omitted here.

Figure 12:
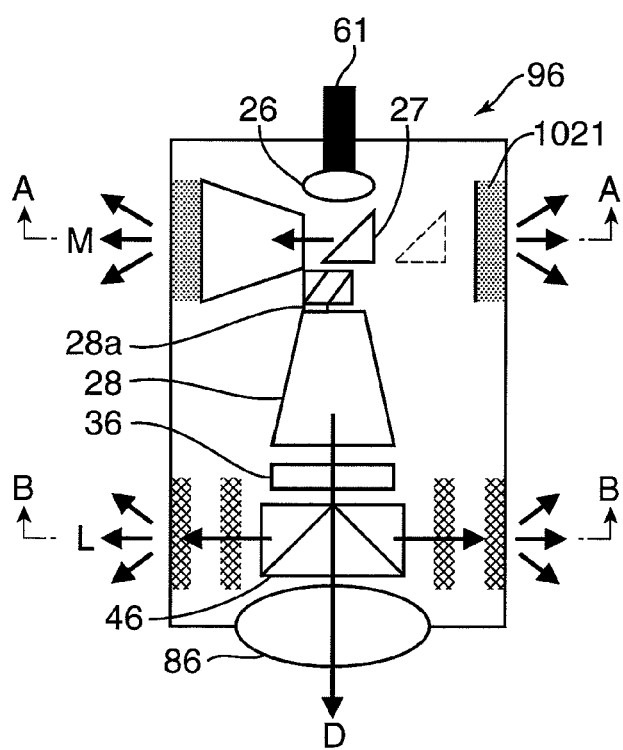
FIG. 12 shows a schematic structure of the movable projection section in the light projection device of FIG. 11.

Light projection device 600 is arranged so as to illuminate the entire room from outside the projection section by using laser lights from laser light sources 1r, 1g, and 1b. The light projection device 600 is mounted, for example, to the indoor ceiling. The laser lights from the laser light source 1r, 1g, and 1b are transmitted to the movable projector section 96 by the multimode fiber 61. As shown in FIG. 12, the light emitted from the multimode fiber 61 is incident on the taper rod integrator 28 via the lens 26. Between the lens 26 and the tapered property rod integrator 28, provided is a mirror shutter 27 so as to be capable of moving forwards and backwards in the direction vertical to the light propagation direction. The mirror shutter 27 controls the intensity of the laser light incident onto the tapered rod integrator 28 and the intensity of the laser light incident onto the diffusion light guide plate 1021. For example, when the mirror shutter 27 is located at position where the light transmitted through the lens 26 is not disturbed, all the lights are incident onto the tapered rod integrator 28 on the downstream side. On the other hand, when the mirror shutter 27 is moved to the position where some or all the lights transmitted through the lens 26 is disturbed, the lights as shielded is incident onto the diffusion light guide plate 1021, and the lights without being shielded are incident onto the tapered rod integrator 28.

The light incident onto the tapered rod integrator 28 is polarized into the linearly polarized light by the polarization conversion prism 28a. The linearly polarized light is then shaped, and the intensity thereof is made uniform for use in illuminating the transmission spatial light modulation element 36. This transmission spatial light modulation element 36 is made up of a liquid crystal element, and performs the modulation by controlling the polarization direction. The resulting modulated laser light is then separated into the light to be incident on the composite PBS 46 and the light to be projected. The light to be projected then passes through the projection lens 86 for use in displaying an image at position as desired, or in illuminating the position as desired. The image display position or the illuminate position by the light D which passes through the projection lens 86 is controlled by moving the movable projector section 96. On the other hand, the light, which has not been used for the projection as being separated by the composite PBS 46, becomes a diffusion illumination light L via the diffusion film 1023a and the diffusion film 1023b and illuminates the entire room.

As described, the light D projected through the projection lens 86 and the diffusion illumination light L are generated by the composite PBS 46. Therefore, when the light that illuminates the transmission spatial light modulation element 36 is white by time calculation, the diffusion illumination light L is a complementary color with respect to the light D to be projected from the projection lens 86. Namely, the diffusion illumination light L has a hue at opposite position to the phase of the projected light D in the color circle. With this diffusion illumination light L of the complementary color for use in global illumination, the light D to be projected has a high contrast to the surroundings. As a result, an improved visibility and a high contrast image display can be realized. Here, the light for use in illumination the transmission spatial light transmission element 36 may slightly differs from the white in strict definition; however, the as long as the light is made up of three colors of red, blue and green, the diffusion illumination light L can be in the complementary color of the light D to be projected. The composite PBS 46, the diffusion film 1023*a* and the diffusion film 1023*b* constitute the complementary color illumination section.

Figure 14:
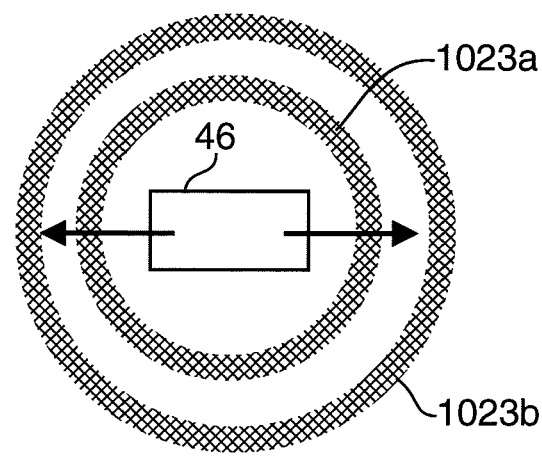
FIG. 14 is a cross-sectional view of the movable projection section of FIG. 12 taken along line B-B of FIG. 12.

As shown in FIG. 14, the diffusion illumination light L is generated by the diffusion layer of double layered structure of diffusion film 1023*a* and diffusion film 1023*b*. The diffusion film 1023*a* and the diffusion film 1023*b* are formed so as to surround the composite PBS 46 so that the light which has not be used for projection as being separated by the composite PBS 46 can be incident into these films. In the case where the laser light is used for illumination, speckle noise may be generated due to the coherence of the laser light. In response, the present embodiment has preferable structure wherein an area light source is realized by adopting the multi-layered diffusion layer. With this structure, it is possible to remove speckle noise of light for use in global illumination.

Figure 13:
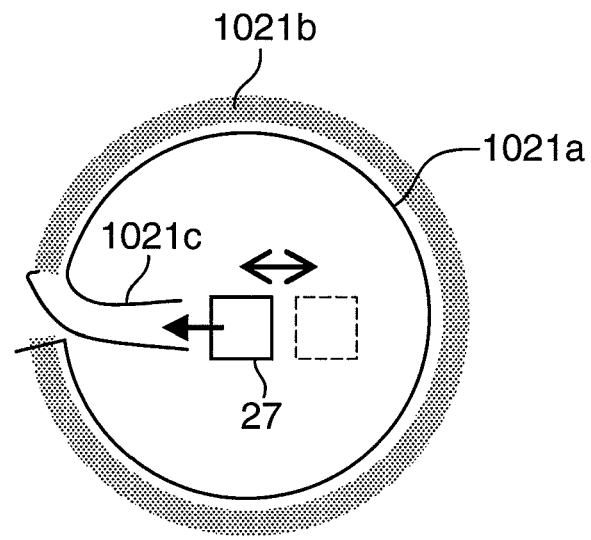
FIG. 13 is a cross-sectional view of the movable projection section of FIG. 12 taken along line A-A of FIG. 12.

As shown in FIG. 13, the diffusion light guide plate 1021 is provided so as to surround the mirror shutter 27. This diffusion light guide plate 1021 includes an inner reflective surface 1021*a* and a resin plate 1021*b* filled with diffusion substances. The diffusion light guide plate 1021 has a light guide section 1021*c* made of a reflective plate, so that the light shielded by the mirror shutter 27 can be incident thereto in an efficient manner. An angle of the light guided to the diffusion light guide plate 1021 is subjected to change by the diffusion substances, and when the angle becomes larger than the total reflection angle (threshold angle) at a boundary between the surface of resin plate 1021*b* and the outside air, the light is output to the outside, and becomes a diffusion illumination light M for use in global illumination. Until the angle of the light guided to the diffusion light guide plate 1021 becomes larger than the total reflection angle, the light in the diffusion light guide plate 1021 is repetitively reflected between the reflective surface 1021*a* and the surface of the resin plate 1021*b*, and is guided within the diffusion light plate 1021. The inner end surface of the diffusion guide plate 1021 also has a reflective surface 1021*a* formed thereon, and the light reaches to the inner end surface is reflected therefrom and is guided again in the diffusion light guide plate 1021. An amount of the diffusion substances is set such that the diffusion illumination light M can be emitted from the entire surface of the diffusion guide plate 1021. The diffusion light guide plate 1021 has a preferable structure adopting a large amount of diffusion substrates, which realizes the area light source, whereby speckle noise of the light for use in global illumination can be removed.

As described, the intensity of the laser light incident into the diffusion light plate 1021 to be used as the diffusion illumination light M is controlled by using the mirror shutter 27. Here, it may be arranged so as to shield all the light passed through the lens 26 by the mirror shutter 27 to obtain only the diffusion illumination light M without the projection light D. The light projection device 600 has the similar structure as the light projection device shown in FIG. 15, wherein the mirror shutter 27 is driven under the control by the controller section 105. This controller section 105 controls the balance between the diffusion illumination light M for use in global illumination and the projection light D by adjusting the opening/shutting of the mirror shutter 27, to realize an optimal illumination state of the room.

As described, the projection light D and the diffusion illumination light L are generated as being separated by the composite PBS 46. Therefore, the diffusion illumination light L changes according to changes in hue or luminance of the projection light D. Here, the light for use in global illumination (the intensity of diffusion illumination light L and the diffusion illumination light M) is subjected to change. However, it is possible to reduce a change in intensity of light for use in global illumination by increasing the intensity of the diffusion illumination light by adjusting the mirror shutter 27.

The present embodiment has a preferable structure wherein a switching element (mirror shutter 27) is provided between the spatial modulation element and the light source for controlling the intensity of the projection light and the intensity of the light for illuminating the entire room. With this structure, it is possible to control the contact by the projection light D and the illuminance of the entire room by controlling the intensity of the projection light D and the diffusion illumination light M for illuminating entire room. Furthermore, even when the diffusion illumination light L is subjected to change, a change in intensity of illumination light for use in global illumination can be reduced.

The light projection device 600 is capable of performing various operations described in the foregoing embodiments including the article search operation (illumination of the article and the guide information display operation) as shown in FIG. 1 through FIG. 3. The light projection device 600 has a preferable structure for searching an article in that a high visibility article can be illuminated or the guide information can be displayed using the projection light D and the diffusion illumination light L which are complementary colors. The application of the light projection device 600 is not limited to the foregoing. For the beneficial feature being capable of performing an emphasized lighting or display using the projection light D and the diffusion illumination light L which are complementary colors, it may be suitably applied for an illumination device or a projector for effective stage lighting effect.

The present invention is not intended to be limited to the foregoing preferred embodiments, and for example, for the modulation method of the projection laser light, those adopting a combination of a linear modulation element and a scanning mirror may be adopted. The wavelength, the shape, etc., of the laser light from the laser light source are not particularly limited. Similarly, the light projection device and the illumination optical system are not particularly limited, as long as a beam shape required for modulating the laser light can be ensured.

As described, a light projection device, according to one aspect of the present invention includes a movable projector section which illuminates or display information by projecting light while moving a projection position; a position detecting section which detects a position of a lost article instructed by a user; a view field detecting section which detects a view field of the user, and a controller section which controls said movable projection section based on the lost article detected by said position detecting section and the view field of the user detected by said view field detecting section, and either directly illuminates the lost article or projects guide information for guiding the user to the lost article within a view field of the user.

According to the foregoing structure, when the user specifies a lost article, the position detecting section detects the position of the lost article, and the view field detecting section detects the view field of the user. Since the controller section controls the movable projection section based on the results of detection, the controller section directly illuminates the lost article by projecting thereto the light to the position at which the lost article locates. In the case where the lost article is at the position where the direct illumination cannot be applied, the controller section projects the guide information for guiding the user to the lost article. Namely, by assisting the user using the illumination or information display by the movable projection section to find the lost article, the user can find out the lost article without trouble.

It is preferable that said movable projection section includes a light source section fixed to said movable projection section, said light source section including at least a laser light source; a movable section for moving the projection position, said movable section including at least a projection optical system; and a flexuous light guide member for guiding light from the light source section to the movable section, said flexuous light guide member being provided between the light source section and the movable section.

According to the foregoing structure, the light source section including the laser light source is fixed, the section that moves for moving the projection position is the movable section including the projection optical system. Here, the light source section and the movable section are connected by the flexuous light guide member for guiding the light. As described, the light source section and the movable section are separated, so that only the projection position can be moved by operating only the movable section. As a result, it is possible to reduce the size of the movable section, which in turn makes it possible to improve the moving speed and reduction in power consumption when operating.

It is preferable that said light source section includes said laser light source; and a light modulation section which performs a spatial modulation with respect to the light emitted from said laser light source; and said light guide member is a fiber bundle which guides the light as spatially modulated by said light modulation section.

According to the foregoing structure, the light emitted from the laser light source is spatially modulated in the fixed light source section. Then, the spatially modulated light is guided to the movable section by the fiber bundle. It is therefore possible to constitute the movable section for moving the projection position with compact components with the projection optical system at the center. As a result, it is possible to significantly improve the moving speed of the projection position and to significant reduce the power consumption when operating.

It is preferable that said movable section includes a light modulation section which performs a spatial modulation with respect to the light emitted from said light guide member, and said projection optical system which projects the light as spatially modulated by said modulation section.

As described, the movable section has a function of carrying out the spatial modulation by the movable section. In this case also, since the light source section and the movable section are separated, it is possible to reduce the movable section.

It is preferable that said movable projection section includes a compact light projection unit which illuminates or displays information by projecting light, and a movable stage stand which detachably holds said compact light projection unit and moves the projection position by moving said compact light projection unit; and said movable stage stand includes a charger section which charges said compact light projection unit when installed therein, so that said compact light projection unit is operable even when detached from said movable stage stand.

As described, when the compact projection unit is detachable from the movable stage stand, and is fixed to the movable stage stand, the movable stage stand can be moved automatically by moving the compact projection unit. In the room where the movable stage stand locates, it is possible to assist the user to look for the lost article by mounting the compact light projection unit to the movable stage stand. When the compact light projection unit is mounted to the movable stage stand, the compact light projection unit is charged. Therefore, even when the compact light projection unit is separated from the movable stage stand, it is possible to illuminate or display information by projecting light. As a result, it is possible to use the compact light projection unit even in the room where the movable stage stand does not exits.

It is preferable that said movable projection section includes a movable mirror which moves the projection position by changing the projection direction of light.

In this case, by using the movable mirror, it is possible to control the projection direction with ease, and to realize compact movable components while saving power consumption of the device.

It is preferable that said movable projection section includes a light projection unit which illuminates or displays information by projecting light, and a self-propelled stage stand which moves said light projection unit by self propulsion.

In this case, since the projection position can be moved by self propulsion, the movable projection section can be placed on floor without fixing it to the ceiling, or the like. Moreover, the projection area can be increased by the self propulsion function.

It is preferable that said controller section controls said movable projection section to project an interactive image for controlling an apparatus within a view field of the user, and includes an image sensor which captures an image showing a state the user operates the interactive image; and said controller section detects a content of the operation with respect to the interactive image based on the captured image by said image sensor, to control the apparatus according to the content of the operation as detected.

According to the foregoing structure, since the movable projection section is capable of changing the projection position, the interactive image (information having an interactive function) can be projected within the view field of the user. This interactive image can be used in replace of the remote-controller for controlling an apparatus. Namely, an image showing a state the user operates the interactive image is captured by the image sensor, and the apparatus is controlled by the controller section according to the content of the operation. As a result, the time and trouble required for searching the remote-controller (material device) can be saved and the material device as lost becomes no longer necessary. The user can operate the apparatus in a comfortable manner by using the interactive image displayed within the user's view field.

It is preferable that the light projection device further includes the interactive image projected by said movable projection section is an image formed by projecting thereto a visible light and infrared light; and said image sensor is an infrared camera.

According to the foregoing structure, the interactive image includes not only a visible light but also infrared light. Further, the content of the operation with respect to the interactive image can be detected by capturing the image of the content of the operation by the infrared camera. Therefore, it is possible to distinguish, for example, whether the object which shields the interactive image is the user's finger or other object with ease. As a result, it is possible to detect the content of the operation of the interactive image with higher precision.

With the foregoing structure, it is preferable to further include a complementary color illumination section which performs global illumination using light in complementary color with respect to a color of light projected by the movable projection section.

According to the foregoing structure, since the global illumination is performed using the light in complementary color with respect to the color of the projection light, a higher contrast between the projection position and the surroundings can be realized. As a result, illumination and information display of higher contrast can be realized, thereby realizing an improved visibility.

It is preferable that the controller section controls said movable projection section to guide the line of sight of the user by spatially moving the projection position while the light is being projected, and changes information to be projected over time.

According to the foregoing structure, by guiding the line of sight of the user by spatially moving the projection position, it is possible to, for example, move the line of sight of the user to the lost article at the position outside the view field of the user. Then, by changing the information to be projected over time while moving the projection position, it is possible to effectively assist the search for the lost article.

It is preferable that the position detection section includes a plurality of position detection sensors for detecting position information as transmitted from an information transmitting end attached to the lost article.

As described, by detecting the position of the lost article based on the position information transmitted from the information transmitting end attached to the lost article, it is possible to detect an accurate position of the lost article with ease. Furthermore, since the lost article can be identified by attaching thereto the information transmitting end, it is possible to increase the number of lost articles with ease.

With the foregoing structure, it is preferable to further include a voice sensor which identifies the lost article by a voice input of the user.

In this case, since the search of the lost article can be executed based on a voice input by the user, it is possible to for the user to operate with nothing in his/her hands. As a result, a light projection device which is very easy to operate can be realized.

It is preferable that said controller section controls the movable projection section to illuminate an area of a view field of the user.

According to the foregoing structure, the illumination is performed not for searching the lost article, but for a spot lighting for reading, for example. In this way, the beneficial feature that the projection position is movable can be appreciated, while illumination the area corresponding to the view field of the user.

With the foregoing structure, it is preferable to further include a diffusion illumination light source which illuminates a room by diffusion light According to the foregoing structure, it is possible to illuminate the entire room, and the light projection device serves as the lighting system for the room.

It is preferable that controller section controls the movable projection section to project information as instructed by the user in a view field of the user.

According to the foregoing structure, the light projection device can be functioned not only for searching the lost article but also as a projector for projecting information as desired by the user.

It is preferable that the light projection device further includes an image sensor, wherein said view field detecting section detects a view field of the user based on the image of the user captured by said image sensor, said controller section controls the movable projection section based on the position of the lost article detected by the position detecting section, the view field of the user detected by the view field detecting section, an allowance of capturing an image of the lost article by the image sensor, to directly illuminate the lost article or project guide information in the view field of the user, for guiding the user to the lost article.

As described, an image of the user is captured by the image sensor, and the view field of the user can be estimated from the captured image. As a result, the view field of the user can be detected by the image sensor with a simple structure. By controlling the movable projection section also based on whether or not the image of the lost article can be detected by the image sensor. As a result, it is possible to assist the user to search for the lost article according to the situation.

It is preferable that when the lost article cannot be captured by the image sensor or the lost article does not exist in the view field of the user, the controller section controls the movable projection section to project the guide information in the view field of the user, for guiding the user to the lost article.

According to the foregoing structure, when the lost article cannot be captured by the image sensor or the lost article does not exist in the view field of the user, the guide information is projected in the view field of the user. It is therefore possible for the user to find out the lost article quickly.

It is preferable that when the lost article can be captured by the image sensor and the lost article exists in the view field of the user, the controller section controls the movable projection section to directly illuminate the lost article.

According to the foregoing structure, when the lost article can be captured by the image sensor and the lost article exists in the view field of the user, the controller section controls the movable projection section to directly illuminate the lost article. It is therefore possible for the user to find out the lost article in a short period of time.

A light projection device according to another aspect of the present invention includes: a movable projector section which illuminates by projecting light or displays information, said movable projector section being capable of moving a projection position; and a complementary color illumination section which performs global illumination using light in complementary color with respect to a color of light projected by said movable projection section.

According to the foregoing structure, the global illumination is performed using the light in complementary color with respect to the color of the light projected by the movable projection section. Therefore, high contract between the projection position and surroundings can be realized. As a result, it is possible to illuminate or display information with high contract, thereby improving the visibility.

INDUSTRIAL APPLICABILITY

The light projection device according to the present invention can be used for searching a lost article, also for displaying information at a location desired by a user.

The invention claimed is:

1. A light projection device, comprising:
a movable projector section which illuminates or display information by projecting light while moving a projection position;
a position detecting section which detects a position of a lost article instructed by a user;
a view field detecting section which detects a view field of the user, and
a controller section which controls said movable projection section based on the lost article detected by said position detecting section and the view field of the user detected by said view field detecting section, and either directly illuminates the lost article or projects guide information for guiding the user to the lost article within a view field of the user.

2. The light projection device as set forth in claim 1, wherein said movable projection section includes:
   a light source section fixed to said movable projection section, said light source section including at least a laser light source;
   a movable section for moving the projection position, said movable section including at least a projection optical system; and
   a flexuous light guide member for guiding light from the light source section to the movable section, said flexuous light guide member being provided between the light source section and the movable section.

3. The light projection device as set forth in claim 2, wherein:
   said light source section includes said laser light source; and a light modulation section which performs a spatial modulation with respect to the light emitted from said laser light source; and
   said light guide member is a fiber bundle which guides the light as spatially modulated by said light modulation section.

4. The light projection device as set forth in claim 2, wherein:
   said movable section includes a light modulation section which performs a spatial modulation with respect to the light emitted from said light guide member, and said projection optical system which projects the light as spatially modulated by said modulation section.

5. The light projection device as set forth in claim 1, wherein:
   said movable projection section includes:
   a compact light projection unit which illuminates or displays information by projecting light, and
   a movable stage stand which detachably holds said compact light projection unit and moves the projection position by moving said compact light projection unit; and
   said movable stage stand includes a charger section which charges said compact light projection unit when installed therein, so that said compact light projection unit is operable even when detached from said movable stage stand.

6. The light projection device as set forth in claim 1, wherein:
   said movable projection section includes a movable mirror which moves the projection position by changing the projection direction of light.

7. The light projection device as set forth in claim 1, wherein:
   said movable projection section includes a light projection unit which illuminates or displays information by projecting light, and a self-propelled stage stand which moves said light projection unit by self propulsion.

8. The light projection device as set forth in claim 1, wherein:
   said controller section controls said movable projection section to project an interactive image for controlling an apparatus within a view field of the user,
   said light projection device further comprising:
   an image sensor which captures an image showing a state the user operates the interactive image; and
   said controller section detects a content of the operation with respect to the interactive image based on the captured image by said image sensor, to control the apparatus according to the content of the operation as detected.

9. The light projection device as set forth in claim 8, wherein:
   the interactive image projected by said movable projection section is an image formed by projecting thereto a visible light and infrared light; and
   said image sensor is an infrared camera.

10. The light projection device as set forth in claim 1, further comprising:
    a complementary color illumination section which performs global illumination using light in complementary color with respect to a color of light projected by said movable projection section.

11. The light projection device as set forth in claim 1, wherein:
    said controller section controls said movable projection section to guide a line of sight of the user by spatially moving the projection position while the light is being projected, and changes information to be projected over time.

12. The light projection device as set forth in claim 1, wherein:
    said position detection section includes a plurality of position detection sensors for detecting position indicative information as transmitted from an information transmitting end attached to the lost article.

13. The light projection device as set forth in claim 1, further comprising:
    a voice sensor which identifies the lost article by a voice input of the user.

14. The light projection device as set forth in claim 1, wherein:
    said controller section controls the movable projection section to illuminate an area of a view field of the user.

15. The light projection device as set forth in claim 14, further comprising:
    a diffusion illumination light source which illuminates a room by diffusion light.

16. The light projection device as set forth in claim 1, wherein:
    said controller section controls the movable projection section to project information as instructed by the user in a view field of the user.

17. The light projection device as set forth in claim 1, further comprising an image sensor,
    wherein said view field detecting section detects a view field of the user based on the image of the user captured by said image sensor,
    said controller section controls the movable projection section based on the position of the lost article detected by the position detecting section, the view field of the user detected by the view field detecting section, an allowance of capturing an image of the lost article by the image sensor, to directly illuminate the lost article or project guide information in the view field of the user, for guiding the user to the lost article.

18. The light projection device as set forth in claim 17, when the lost article cannot be captured by the image sensor or the lost article does not exist in the view field of the user, the controller section controls the movable projection section to project the guide information in the view field of the user, for guiding the user to the lost article.

19. The light projection device as set forth in claim 17, when the lost article can be captured by the image sensor and the lost article exists in the view field of the user, the controller section controls the movable projection section to directly illuminate the lost article.

20. A light projection device, comprising:

a movable projector section which illuminates by projecting light or displays information, said movable projector section being capable of moving a projection position; and a complementary color illumination section which performs global illumination using light in complementary color with respect to a color of light projected by said movable projection section.

* * * * *